US012358301B2

(12) United States Patent
Budraa

(10) Patent No.: US 12,358,301 B2
(45) Date of Patent: Jul. 15, 2025

(54) ACTIVE MIXER IN JETTING CHANNELS OF A PRINTHEAD

(71) Applicant: Nasser Budraa, La Crescenta, CA (US)

(72) Inventor: Nasser Budraa, La Crescenta, CA (US)

(73) Assignee: Ricoh Company Ltd., Tokyo (JP)

( * ) Notice: Subject to any disclaimer, the term of this patent is extended or adjusted under 35 U.S.C. 154(b) by 105 days.

(21) Appl. No.: 18/110,813

(22) Filed: Feb. 16, 2023

(65) Prior Publication Data

US 2024/0278583 A1 Aug. 22, 2024

(51) Int. Cl.
*B41J 2/21* (2006.01)
*B41J 2/14* (2006.01)

(52) U.S. Cl.
CPC ...... *B41J 2/211* (2013.01); *B41J 2002/14193* (2013.01); *B41J 2002/14467* (2013.01); *B41J 2002/14483* (2013.01); *B41J 2202/19* (2013.01)

(58) Field of Classification Search
CPC .................... B41J 2002/14193; B41J 2/14282
See application file for complete search history.

(56) References Cited

U.S. PATENT DOCUMENTS

| | | | | |
|---|---|---|---|---|
| 5,781,212 | A | 7/1998 | Burr et al. | |
| 6,109,744 | A | 8/2000 | Nishimura | |
| 6,394,589 | B1 | 5/2002 | Willus et al. | |
| 6,464,336 | B1 * | 10/2002 | Sharma | B41J 2/211 347/43 |
| 6,663,229 | B2 * | 12/2003 | Komuro | B41J 2/1603 347/65 |
| 7,494,208 | B2 | 2/2009 | Kwon et al. | |
| 7,588,671 | B2 | 9/2009 | Morita et al. | |
| 7,607,766 | B2 | 10/2009 | Steiner | |
| 7,762,638 | B2 | 7/2010 | Cruchon-Dupeyrat et al. | |
| 8,529,026 | B2 | 9/2013 | Clarke et al. | |
| 9,694,582 | B1 | 7/2017 | Stephens et al. | |
| 9,833,994 | B2 | 12/2017 | Nishimura et al. | |
| 11,020,736 | B2 | 6/2021 | Abate et al. | |
| 11,034,149 | B2 | 6/2021 | Nishimura | |
| 2004/0032793 | A1 | 2/2004 | Falcon | |
| 2006/0092236 | A1 * | 5/2006 | Kwon | B41J 2/055 347/68 |

(Continued)

FOREIGN PATENT DOCUMENTS

| | | | |
|---|---|---|---|
| CN | 103796835 | B | 4/2016 |
| JP | 2012011629 | A | 1/2012 |

(Continued)

OTHER PUBLICATIONS

Aryasomayajula et al; 16. Microfluidic Devices and Their Applications; Springer Handbook of Nanotechnology; 2017.

(Continued)

*Primary Examiner* — Shelby L Fidler
(74) *Attorney, Agent, or Firm* — Duft & Bornsen, PC

(57) ABSTRACT

Printheads that jet print fluids. In an embodiment, a printhead comprises a plurality of jetting channels. Each jetting channel of the plurality includes a diaphragm, a pressure chamber, and a nozzle configured to jet a print fluid, and further includes one or more intra-chamber active mixers disposed in the pressure chamber. An intra-chamber active mixer comprises a cantilever having a connected end rigidly connected to a vertical side wall of the pressure chamber, and a free end that is free to move.

22 Claims, 32 Drawing Sheets

(56) References Cited

U.S. PATENT DOCUMENTS

| | | | | |
|---|---|---|---|---|
| 2006/0119661 | A1 | 6/2006 | Silverbrook | |
| 2006/0290755 | A1 | 12/2006 | Lee | |
| 2007/0058010 | A1 * | 3/2007 | Nagashima | B41J 2/14233 347/85 |
| 2008/0088669 | A1 * | 4/2008 | Shimura | B41J 2/1433 347/47 |
| 2008/0266359 | A1 * | 10/2008 | Iijima | B41J 2/14427 347/54 |
| 2011/0085012 | A1 | 4/2011 | Nishikawa et al. | |
| 2013/0050351 | A1 * | 2/2013 | Mardilovich | B41J 2/14282 347/68 |
| 2013/0169715 | A1 | 7/2013 | Paeng et al. | |
| 2014/0063132 | A1 | 3/2014 | Scheffelin et al. | |
| 2019/0291429 | A1 | 9/2019 | Takabe et al. | |
| 2020/0001603 | A1 | 1/2020 | Fukuzawa et al. | |
| 2020/0156308 | A1 | 5/2020 | Ramos et al. | |
| 2020/0290347 | A1 | 9/2020 | Nishimura | |
| 2020/0290349 | A1 | 9/2020 | Nishimura | |
| 2021/0155007 | A1 | 5/2021 | Wang et al. | |
| 2022/0266512 | A1 | 8/2022 | Somarakis et al. | |
| 2022/0297426 | A1 | 9/2022 | Kanzaki et al. | |

FOREIGN PATENT DOCUMENTS

| | | | |
|---|---|---|---|
| JP | 2017513740 | A | 6/2017 |
| JP | 2020168810 | A | 10/2020 |
| JP | 2020199667 | A | 12/2020 |
| WO | 2015163487 | A1 | 10/2015 |

OTHER PUBLICATIONS

Giovanni Egidi; Development of microfluidic devices for chemical analysis and fluid handling; University of Neuchatel, Switzerland; 2004.

Kungurtsev et al; Adjoint-based shape optimization of the microchannels in an inkjet printhead; Cambridge University Press 2019.

European Search Report; Application EP24157562; Jul. 2, 2024.

Japanese Office action; Application JP2024-021689; Dec. 24, 2024.

* cited by examiner

ACTIVE MIXER IN JETTING CHANNELS OF A PRINTHEAD

TECHNICAL FIELD

The following disclosure relates to the field of image formation, and in particular, to printheads and/or the design of printheads.

BACKGROUND

Image formation is a procedure whereby a digital image (e.g., a 2D image, a 3D image or model, etc.) is recreated by propelling droplets of ink or another type of print fluid onto a medium, such as paper, plastic, a substrate for 3D printing, etc. Image formation is commonly employed in apparatuses, such as printers (e.g., inkjet printer, 3D printer, etc.), facsimile machines, copying machines, plotting machines, multifunction peripherals, etc. The core of a typical jetting apparatus or image forming apparatus is one or more liquid-droplet ejection heads (referred to generally herein as “printheads”) having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a “jetting channel”, which includes the nozzle, a pressure chamber, and a diaphragm that vibrates in response to an actuator, such as a piezoelectric actuator. A printhead also includes a driver circuit that controls when each individual jetting channel fires based on image or print data. To jet from a jetting channel, the driver circuit provides one or more jetting pulses to the actuator, which cause the actuator to deform a wall of the pressure chamber (i.e., the diaphragm). The deformation of the pressure chamber creates pressure waves within the pressure chamber that eject one or more droplets of print fluid (e.g., ink) out of the nozzle.

Nozzle failures may occur in a printhead due to a variety of factors, such as drying of print fluid at a nozzle or meniscus, sedimentation of the print fluid, bubbles present in the print fluid, etc. These and other nozzle failures may result in poor print quality.

SUMMARY

Embodiments described herein provide for an intra-chamber active mixer in jetting channels of a printhead, and associated method of using the printhead. In an embodiment, one or more intra-chamber active mixers are implemented within a pressure chamber of a jetting channel. An intra-chamber active mixer is configured to oscillate and mix the print fluid within the pressure chamber. One technical benefit is the print fluid is mixed within the jetting channel to restore homogeneity of the print fluid.

In an embodiment, a printhead comprises a plurality of jetting channels. Each jetting channel of the plurality includes a diaphragm, a pressure chamber, and a nozzle configured to jet a print fluid, and further includes one or more intra-chamber active mixers disposed in the pressure chamber. An intra-chamber active mixer comprises a cantilever having a connected end rigidly connected to a vertical side wall of the pressure chamber, and a free end that is free to move.

In an embodiment, a printhead comprises a housing, and a plate stack attached to the housing that forms a plurality of jetting channels. Each jetting channel of the plurality includes a diaphragm, a pressure chamber, and a nozzle configured to jet a print fluid, and further includes one or more intra-chamber active mixers disposed in the pressure chamber. An intra-chamber active mixer comprises a cantilever having a connected end rigidly connected to a vertical side wall of the pressure chamber, and a free end that is free to move.

In an embodiment, a method comprises operating a printhead comprising a plurality of jetting channels where each jetting channel of the plurality includes: a diaphragm, a pressure chamber, a nozzle configured to jet a print fluid, and one or more intra-chamber active mixers disposed in the pressure chamber. An intra-chamber active mixer comprises a cantilever having a connected end rigidly connected to a vertical side wall of the pressure chamber, and a free end that is free to move. Operating the printhead comprises receiving the print fluid in the pressure chamber, and oscillating the free end of the cantilever to mix the print fluid in the pressure chamber.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
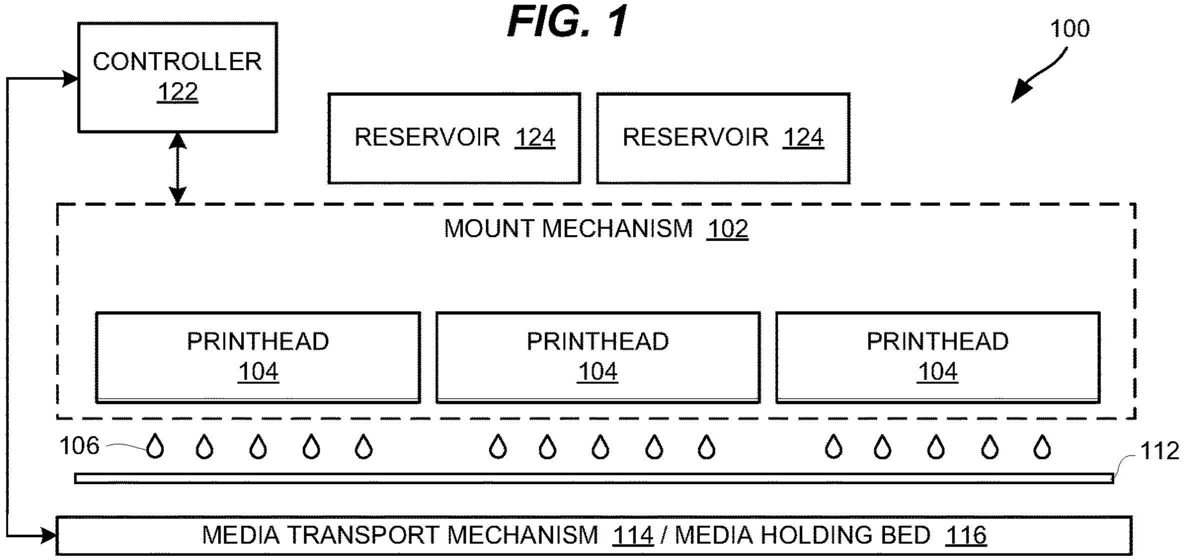
FIG. 1 is a schematic diagram of a jetting apparatus in an illustrative embodiment.

FIG. 1 is a schematic diagram of a jetting apparatus 100 in an illustrative embodiment. A jetting apparatus 100 is a device or system that uses one or more printheads to eject a print fluid or marking material onto a medium. One example of jetting apparatus 100 is an inkjet printer (e.g., continuous feed or cutsheet printer) that performs single-pass printing. Other examples of jetting apparatus 100 include a scan pass inkjet printer (e.g., a wide format printer), a multifunction printer, a desktop printer, an industrial printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. Printheads 104 are a device, apparatus, or component configured to eject droplets 106 of a print fluid, such as ink (e.g., water, solvent, oil, or UV-curable), through a plurality of nozzles (not visible in FIG. 1). The droplets 106 ejected from the nozzles of printheads 104 are directed toward medium 112. Medium 112 comprises any type of material upon which ink or another print or jetting fluid is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 (e.g., a platen) is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive a print job, print data, image data, or the like, and control each printhead 104 to discharge the print fluid onto medium 112. Jetting apparatus 100 also includes one or more reservoirs 124 for a print fluid or multiple types of print fluid. Although not shown in FIG. 1, reservoirs 124 are fluidly coupled to printheads 104, such as with hoses or the like.

Figure 2:
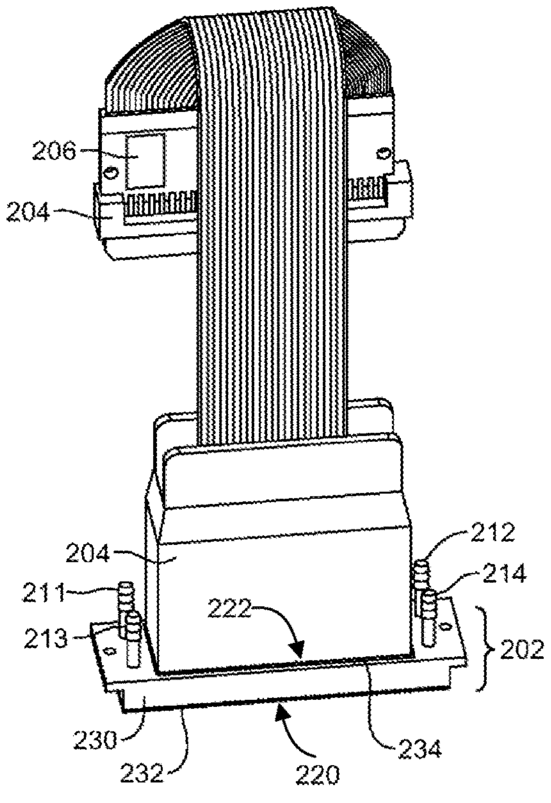
FIG. 2 is a perspective view of a printhead in an illustrative embodiment.

FIG. 2 is a perspective view of a printhead 104 in an illustrative embodiment. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals received from another controller (e.g., jetting apparatus controller 122). Electronics 204 include an embedded printhead controller 206 or driver circuits configured to drive individual jetting channels based on the data signals and control signals. The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an inlet or entry point for a print fluid. An I/O port 211-214 may comprise an outlet I/O port, which is an opening in head member 202 that acts as an outlet or exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

In general, head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, a support (or support) plate, and a diaphragm plate. A nozzle plate includes a plurality of nozzles that are arranged in one or more rows. A chamber plate includes a plurality of openings that form the pressure chambers of the jetting channels. A restrictor plate includes a plurality of openings that form restrictors to fluidly couple the pressure chambers of the jetting channels with a manifold. A diaphragm plate is a sheet of a semi-flexible material that vibrates in response to actuation by an actuator (e.g., piezoelectric actuator).

FIG. 2 illustrates one particular configuration of a printhead 104, and it is understood that other printhead configurations are considered herein that have a plurality of jetting channels.

Figure 3:
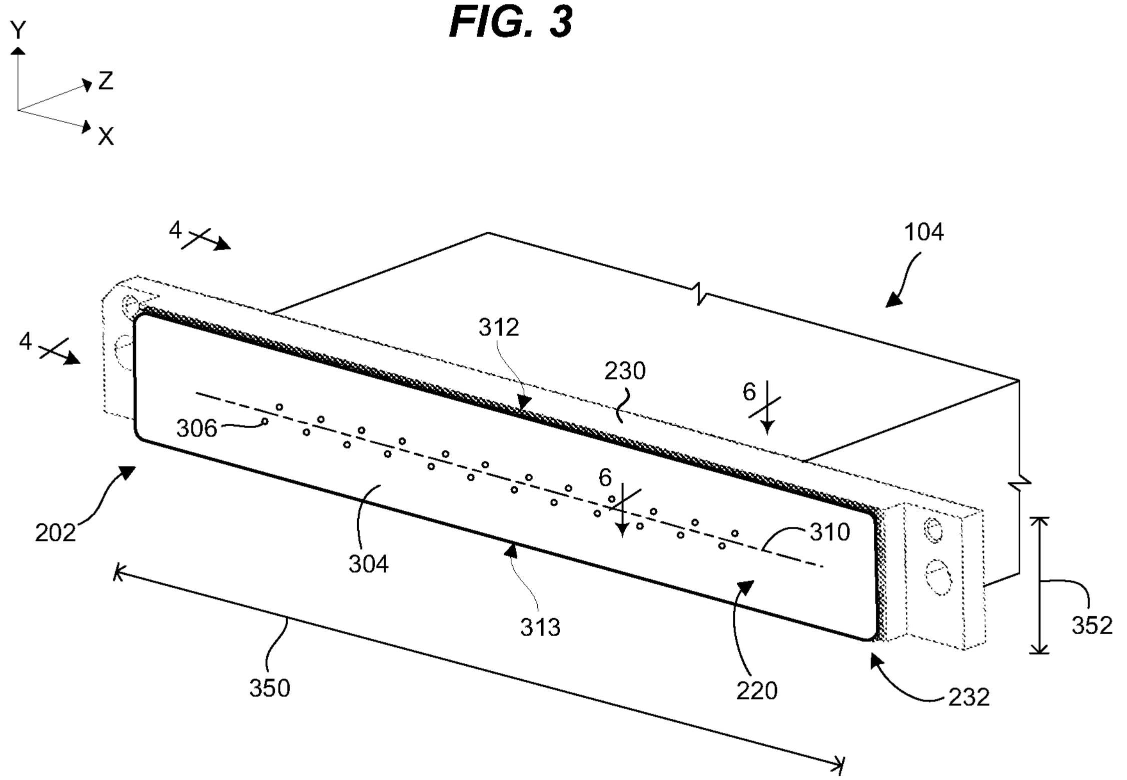
FIG. 3 is a perspective view of a printhead in an illustrative embodiment.

FIG. 3 is a perspective view of a printhead 104 in an illustrative embodiment. In an embodiment, head member 202 is an assembly that includes housing 230, and plate stack 232 affixed or attached to housing 230. Plate stack 232 is an elongated stack having a length 350 (i.e., along the x-axis) and a width 352 (i.e., along the y-axis). For this description, the x-axis is along the length 350 of the printhead 104, and may be referred to as the x-direction, the lengthwise direction, the longitudinal direction, etc. The y-axis is along the width 352 of the printhead 104, and may be referred to as the y-direction, the widthwise direction, the transverse direction, etc. The z-axis is along the height of the printhead 104, and may be referred to as the z-direction, the height direction, etc. Plate stack 232 includes one or more nozzle plates 304 having orifices that form nozzles 306 of the jetting channels. Thus, the bottom surface of nozzle plate 304 defines the discharge surface 220 of printhead 104. Nozzles 306 are shown in two nozzle rows in FIG. 3 disposed longitudinally along the length 350 of plate stack 232 and generally parallel to longitudinal sides 312-313 of printhead 104/plate stack 232. A longitudinal centerline 310 of printhead 104/plate stack 232 is shown along the x-axis between adjacent rows of jetting channels (illustrated by their corresponding nozzles), and represents an axis of symmetry between the rows. Although two rows of nozzles 306 are illustrated in FIG. 3, the jetting channels and their corresponding nozzles 306 may be arranged in a single row or more than two rows in other embodiments.

Figure 4:
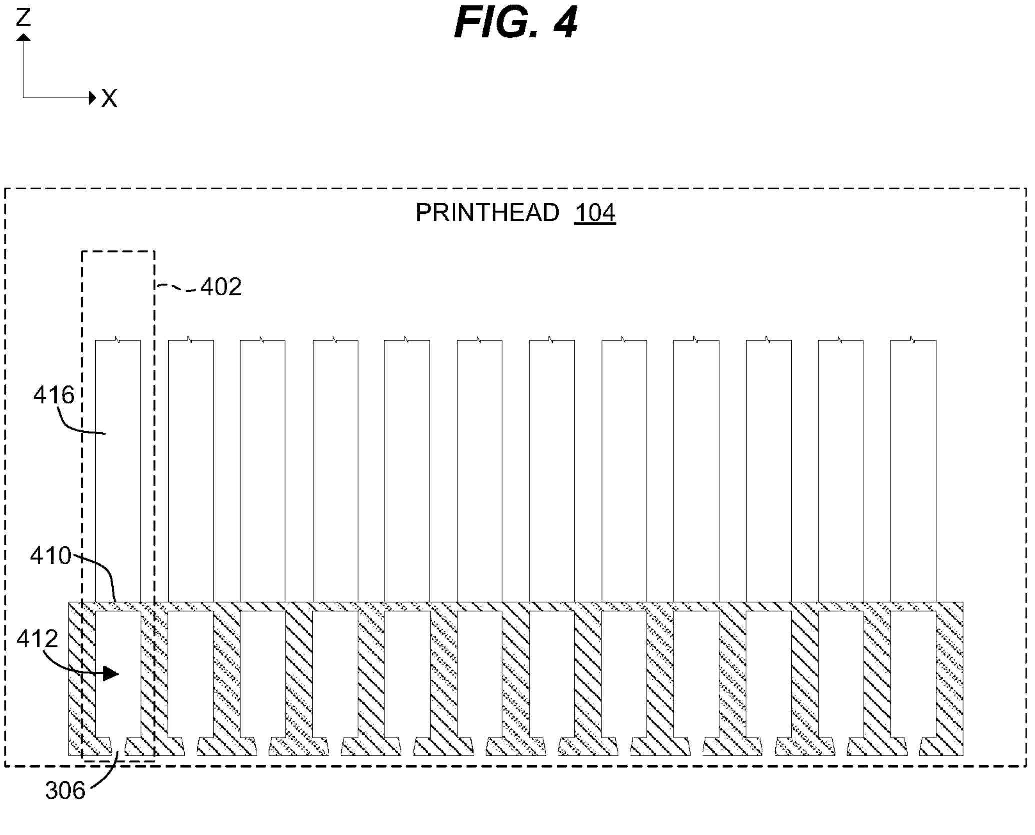
FIG. 4 is a cross-sectional view of a printhead in an illustrative embodiment.

FIG. 4 is a cross-sectional view of a printhead 104 in an illustrative embodiment. FIG. 4 shows a cross-section of a portion of a row of jetting channels 402 along cut-plane 4-4 in FIG. 3. A jetting channel 402 is a structural element within printhead 104 configured to jet or eject a print fluid. Each jetting channel 402 includes a diaphragm 410, a pressure chamber 412 (also referred to as a Helmholtz chamber), and a nozzle 306. An actuator 416 contacts diaphragm 410 to control jetting from a jetting channel 402. Jetting channels 402 may be formed in rows along the length 350 of printhead 104 (i.e., plate stack 232), and each jetting channel 402 may have a similar configuration as shown in FIG. 4.

Figure 5A:
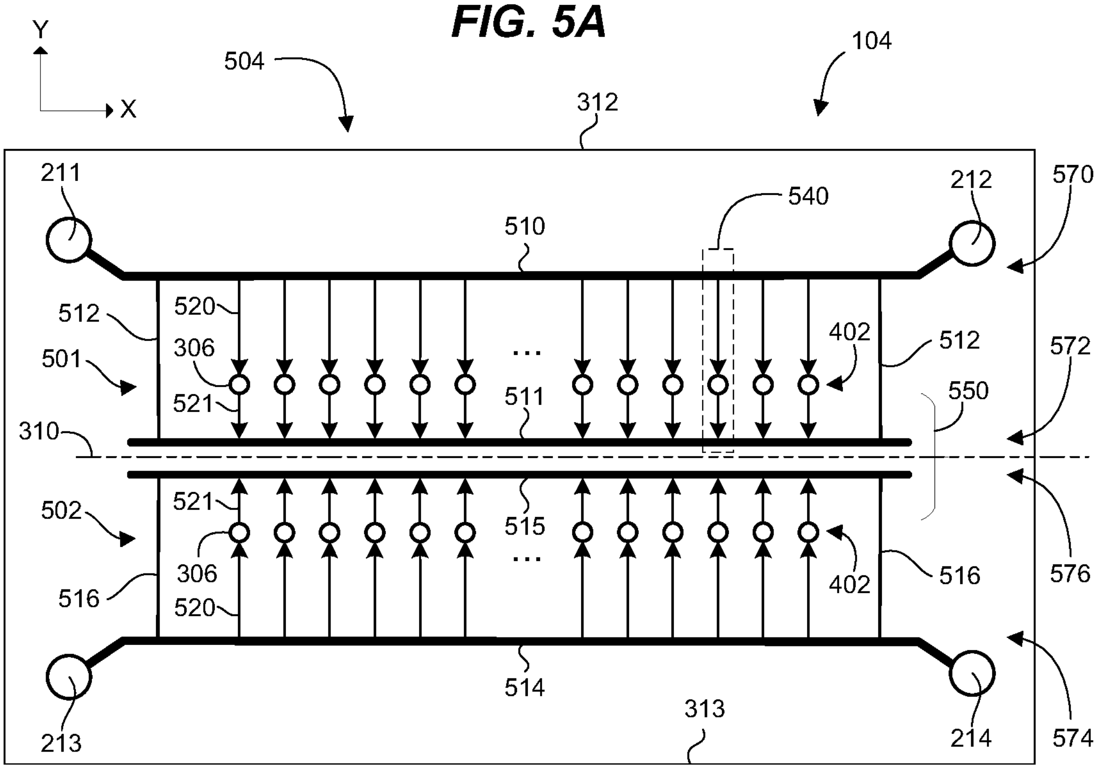
FIG. 5A-5D are schematic diagrams of a printhead in an illustrative embodiment.

FIG. 5A-5D are schematic diagrams of a printhead 104 in an illustrative embodiment. In FIG. 5A, printhead 104 may be a flow-through print head 504 where print fluid may be circulated through jetting channels 402 past their corresponding nozzles 306. Thus, the jetting channels 402 themselves may be referred to as flow-through jetting channels 540. Rows 501-502 of jetting channels 402 in printhead 104 are schematically illustrated in FIG. 5A as rows of nozzles 306. In general, a plurality of jetting channels 402 for printhead 104 are arranged in rows 501-502 disposed longitudinally (i.e., along the x-axis) along the length 350 of the printhead 104, and are generally in parallel with one another. Printhead 104 includes manifolds 510-511 and 514-515. A manifold is a common conduit or channel internal to printhead 104 (i.e., internal to housing 230 and/or plate stack 232) that provides a common fluid pathway for a plurality of jetting channels 402. In row 501, for example, each jetting channel 402 may be fluidly coupled to manifolds 510-511. In an embodiment, manifold 510 may be referred to as a supply manifold when configured or operated to supply print fluid to a set of jetting channels 402 in row 501. Manifold 510, for example, may be fluidly coupled between I/O ports 211-212 to receive a print fluid from an external source, and may act as a common supply conduit having the capacity to supply print fluid to a plurality of jetting channels 402. Manifold 511 may be referred to as a return manifold when configured or operated to receive print fluid from jetting channels 402 in row 501. The print fluid that is not jetted from a nozzle 306 of a jetting channel 402 may be referred to herein as "non-jetted print fluid". Thus, a manifold that receives a print fluid from jetting channels 402 may be referred to herein as receiving non-jetted print fluid. Manifold 511 may act as a common return conduit having the capacity to receive non-jetted print fluid from a plurality of jetting channels 402 in row 501. Manifold 511 is fluidly coupled with manifold 510 through the jetting channels 402 in row 501, and may also be fluidly coupled with manifold 510 through one or more inter-manifold fluid passages 512.

In row 502, for example, each jetting channel 402 may be fluidly coupled to manifolds 514-515. In an embodiment, manifold 514 may be referred to as a supply manifold when configured or operated to supply print fluid to a set of jetting channels 402 in row 502. Manifold 514, for example, may be fluidly coupled between I/O ports 213-214 to receive a print fluid from an external source, and may act as a common supply conduit having the capacity to supply print fluid to a plurality of jetting channels 402. Manifold 515 may be referred to as a return manifold when configured or operated to receive print fluid from jetting channels 402 in row 502. Manifold 515 may act as a common return conduit having the capacity to receive non-jetted print fluid from a plurality of jetting channels 402 in row 502. Manifold 515 is fluidly coupled with manifold 514 through the jetting channels 402 in row 502, and may also be fluidly coupled with manifold 514 through one or more inter-manifold fluid passages 516.

Although manifolds 510 and 514 may be referred to herein as supply manifolds and manifolds 511 and 515 may be referred to herein as return manifolds, a flow of print fluid may be reversed in printhead 104. Thus, manifolds 510 and 514 may comprise return manifolds and manifolds 511 and 515 may comprise supply manifolds when the flow is reversed (i.e., opposite flow to what is illustrated in FIG. 5A).

In FIG. 5A, each jetting channel 402, as a flow-through type of jetting channel 540, has an independent fluid path into a pressure chamber 412 and an independent fluid path out of the pressure chamber 412, which are not shared or common with another jetting channel 402. For example, each jetting channel 402 of row 501 includes a channel fluid passage 520 (also referred to as a channel fluid conduit)

between manifold 510 and a pressure chamber 412 of the jetting channel 402 (see also, FIG. 4), and also includes a channel fluid passage 521 between the pressure chamber 412 of the jetting channel 402 and manifold 511. Channel fluid passages 520-521 represent distinct pathways for print fluid to flow, for example, from manifold 510 into a pressure chamber 412, and for (non-jetted) print fluid to flow out of the pressure chamber 412 to manifold 511 (or in the reverse direction).

Similarly, each jetting channel 402 of row 502 includes a channel fluid passage 520 between manifold 514 and a pressure chamber 412 of the jetting channel 402 (see also, FIG. 4), and also includes a channel fluid passage 521 between the pressure chamber 412 of the jetting channel 402 and manifold 515. Channel fluid passages 520-521 represent distinct pathways for print fluid to flow, for example, from manifold 514 into a pressure chamber 412, and for (non-jetted) print fluid to flow out of the pressure chamber 412 to manifold 515 (or in the reverse direction).

In an embodiment, the major portions or sections of manifolds 510-511 and 514-515 are disposed longitudinally (i.e., along the x-axis) within printhead 104 to fluidly couple with jetting channels 402 arranged in a row 501-502. In some flow-through printheads, a return manifold is disposed longitudinally on the same side of a row of jetting channels as the supply manifold. In an embodiment herein, manifolds 510-511 are disposed on opposite sides of the row 501 of jetting channels 402. Likewise, manifolds 514-515 are disposed on opposite sides of the row 502 of jetting channels 402. To illustrate this structure, longitudinal sides 312-313 of printhead 104 are shown. Manifold 510 is disposed on one side 570 (i.e., a first side) of the row 501 of jetting channels 402 between longitudinal side 312 and row 501, and manifold 511 is disposed on the other side 572 (i.e., a second side) of the row 501 of jetting channels 402 between adjacent rows 501-502 (i.e., between row 501 and the longitudinal centerline 310). A "side" of a row of jetting channels 402 comprises a longitudinal side along the length of the row. Manifold 511 is disposed in an intermediate region 550 between the rows 501-502 of jetting channels 402 as are the channel fluid passages 521 of the individual jetting channels 402 in row 501. Likewise, manifold 514 is disposed on one side 574 (i.e., a first side) of the row 502 of jetting channels 402 between longitudinal side 313 and the row 502, and manifold 515 is disposed on the other side 576 (i.e., a second side) of the row 502 of jetting channels 402 between adjacent rows 501-502 (i.e., between row 502 and the longitudinal centerline 310). Manifold 515 is disposed in intermediate region 550 between the rows 501-502 as are the channel fluid passages 521 of the individual jetting channels 402 in row 502. Thus, manifold 511 is disposed between row 501 and manifold 515, and manifold 515 is disposed between row 502 and manifold 511.

Figure 5B:
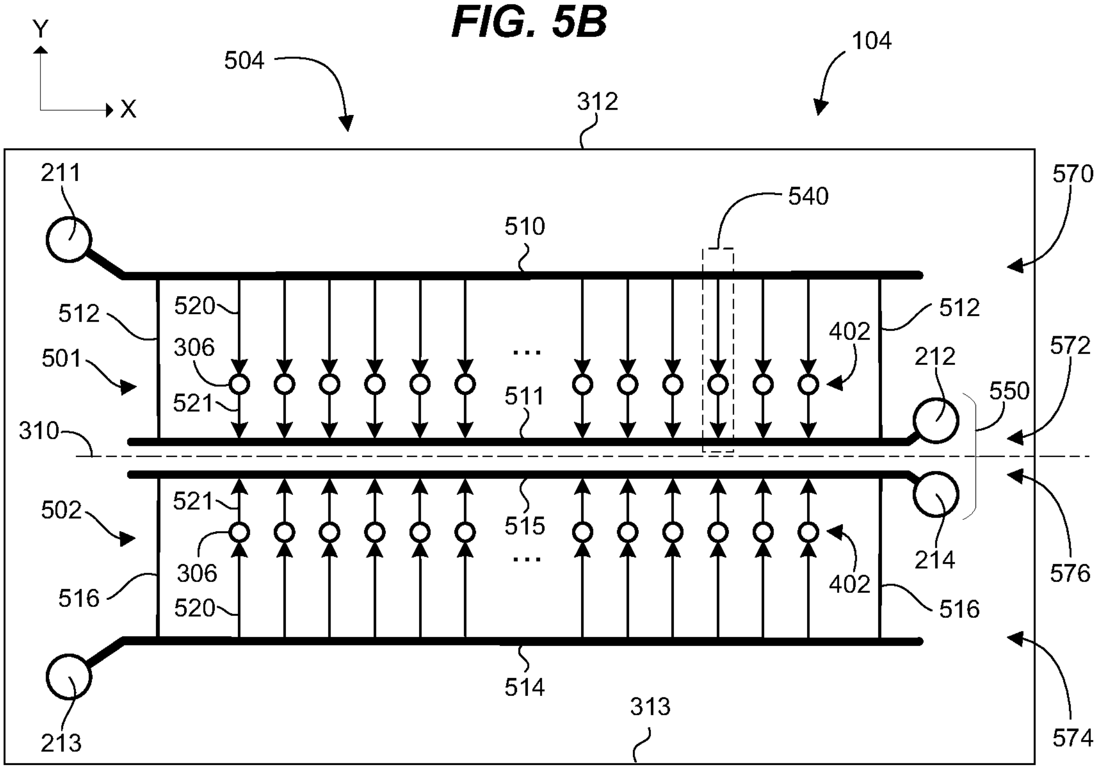

In FIG. 5B, manifold 510, for example, may be fluidly coupled to I/O port 211 such as to receive a print fluid from an external source, and manifold 511 may be fluidly coupled to I/O port 212 such as to provide an exit path for print fluid out of the printhead 104 to an external container. Likewise, manifold 514, for example, may be fluidly coupled to I/O port 213 such as to receive a print fluid from an external source, and manifold 515 may be fluidly coupled to I/O port 214 such as to provide an exit path for print fluid out of the printhead 104 to an external container. For the sake of brevity, it is understood that the concepts described above for FIG. 5A apply to the configuration in FIG. 5B.

Figure 5C:
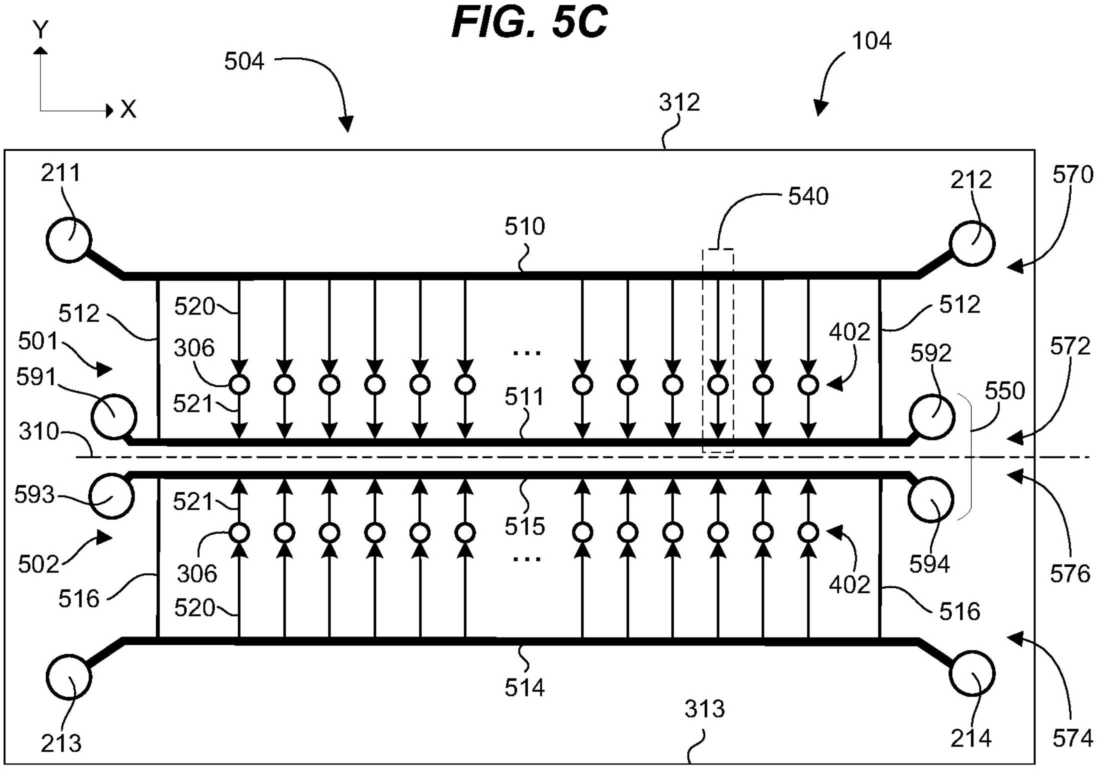

In FIG. 5C, a printhead 104 may include additional I/O ports 591-594. Manifold 510, for example, may be fluidly coupled to I/O ports 211-212, manifold 511 may be fluidly coupled to I/O ports 591-592, manifold 514 may be fluidly coupled to I/O ports 213-214, and manifold 515 may be fluidly coupled to I/O ports 593-594. For the sake of brevity, it is understood that the concepts described above for FIG. 5A apply to the configuration in FIG. 5C.

Figure 5D:
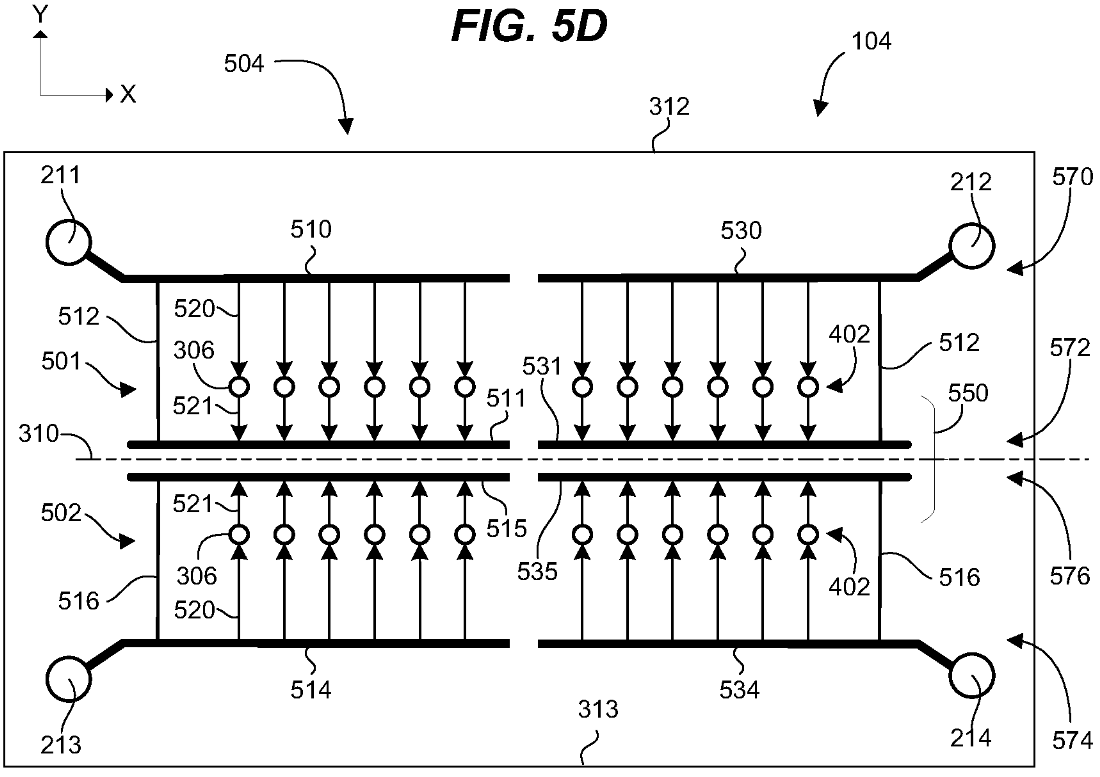

In the configurations illustrated in FIG. 5A-5C, a printhead 104 may be operated to jet a single type of print fluid (e.g., a single color) or two different types of print fluids (e.g., two colors). However, a printhead 104 may be configured to jet more types of print fluids. FIG. 5D is a schematic diagram of a printhead 104 in an illustrative embodiment. In this embodiment, printhead 104 includes manifolds 510-511, 514-515, 530-531, and 534-535. In row 501, a subset of jetting channels 402 is fluidly coupled to manifolds 510-511, and a subset of jetting channels 402 is fluidly coupled to manifolds 530-531. In row 502, a subset of jetting channels 402 is fluidly coupled to manifolds 514-515, and a subset of jetting channels 402 is fluidly coupled to manifolds 534-535. For the sake of brevity, it is understood that the concepts described above for FIG. 5A apply to the configuration in FIG. 5D. In the configuration illustrated in FIG. 5D, printhead 104 may be operated to jet a single type of print fluid (e.g., a single color), two different types of print fluids (e.g., two colors), or four different types of print fluids (e.g., four colors).

One or more methods may be used to circulate print fluid through jetting channels 402 of printhead 104. For example, the pressure in the manifold 510 and/or manifold 511 may be regulated to create a pressure differential between the manifolds 510-511. The pressure differential causes the print fluid to flow through the jetting channels 402 in row 501. Similarly, the pressure in the manifold 514 and/or manifold 515 may be regulated to create a pressure differential between the manifolds 514-515. The pressure differential causes the print fluid to flow through the jetting channels 402 in row 502.

Figure 6A:
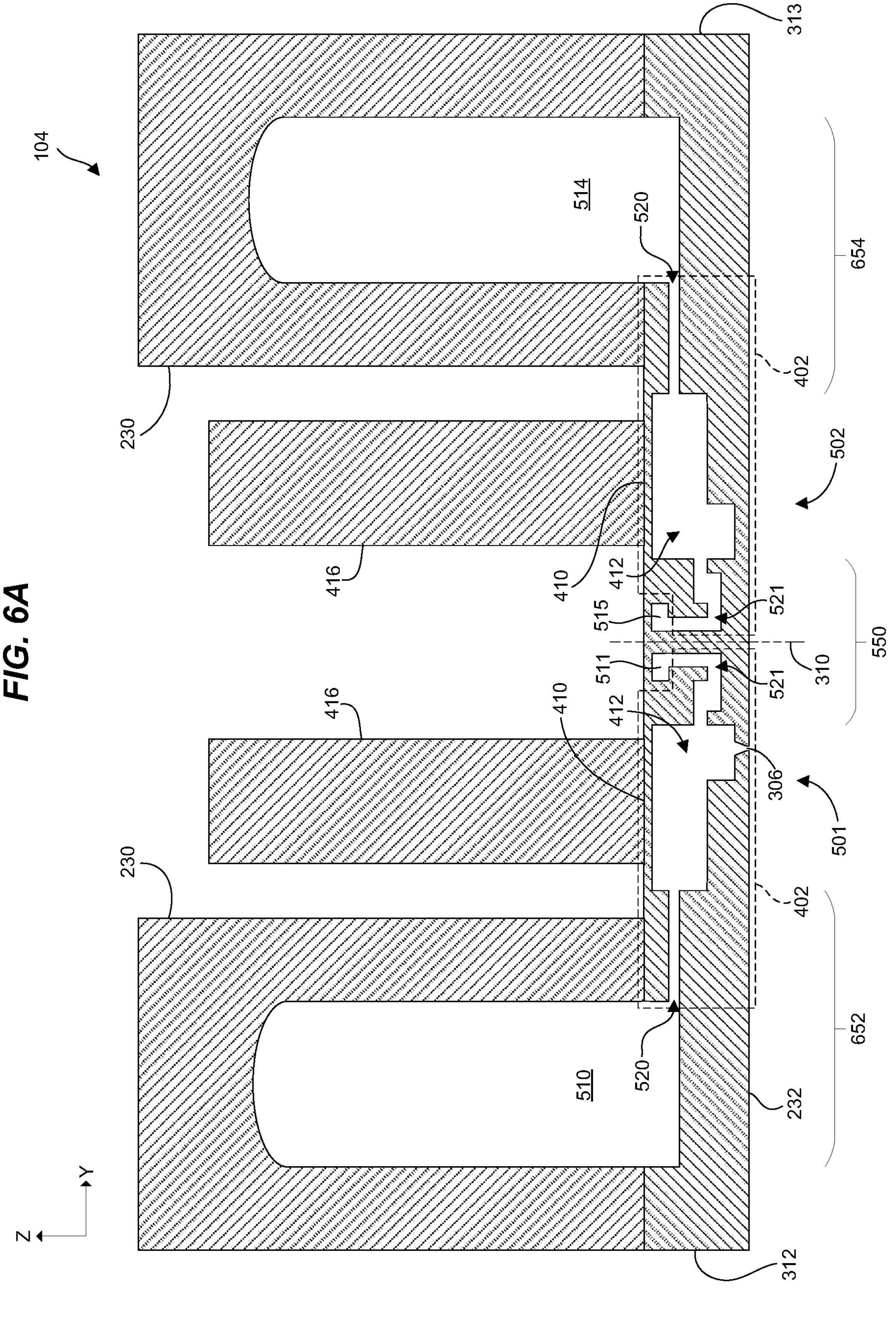
FIGS. 6A-6B are cross-sectional views of a portion of a printhead in an illustrative embodiment.
Figure 6B:
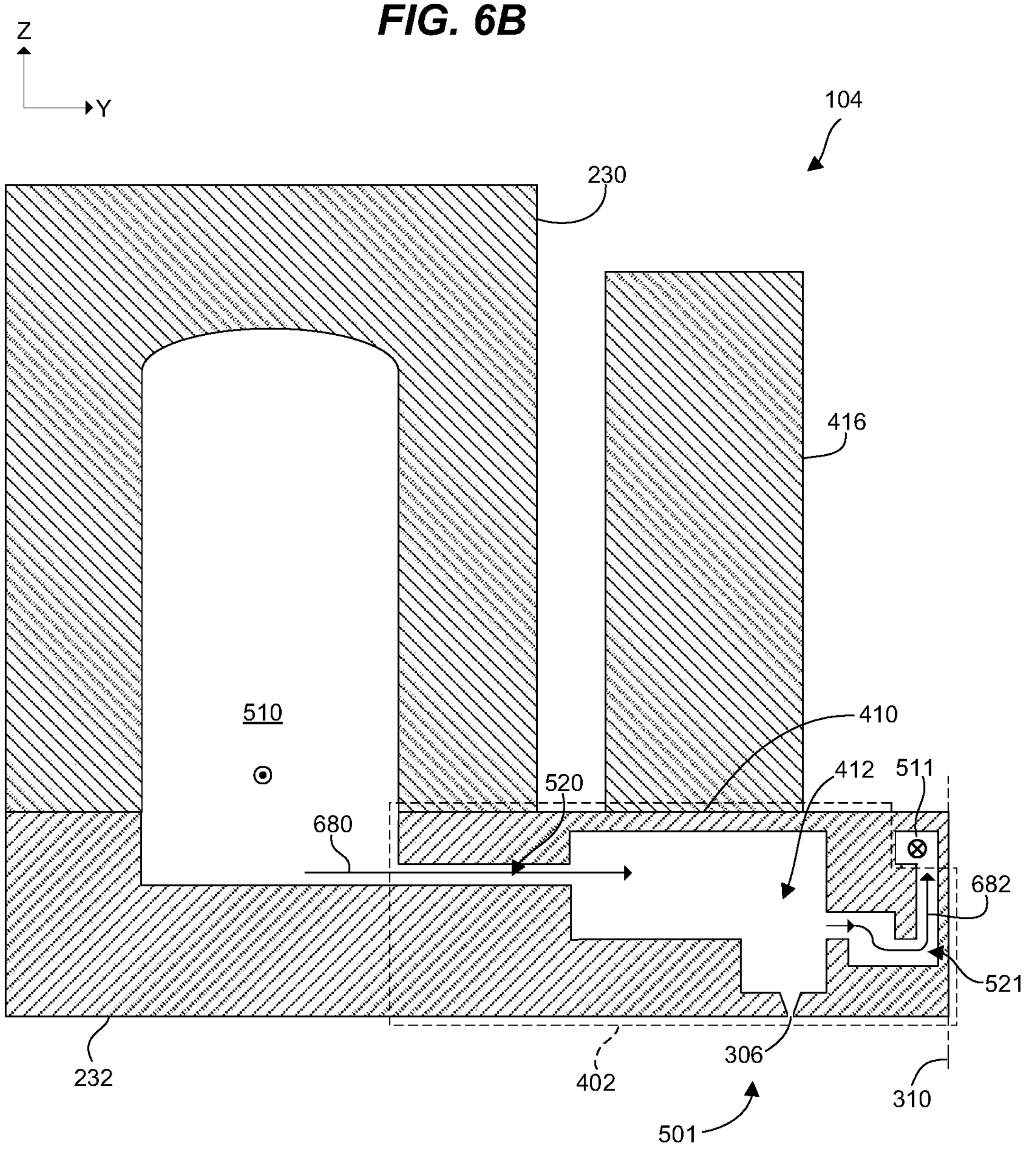

FIGS. 6A-6B are cross-sectional views of a portion of printhead 104 in an illustrative embodiment. FIGS. 6A-6B show a cross-section of printhead 104 along cut-plane 6-6 in FIG. 3. In FIG. 6A, two jetting channels 402 are shown in adjacent rows 501-502. As in FIG. 4, a jetting channel 402 includes diaphragm 410, pressure chamber 412, and nozzle 306 (it is noted that the nozzle 306 of the jetting channel 402 in row 502 is not visible in this cross-section). Manifold 510 of printhead 104 is fluidly coupled to a jetting channel 402 of row 501. More particularly, pressure chamber 412 of the jetting channel 402 is fluidly coupled to manifold 510 through a channel fluid passage 520. In an embodiment, the channel fluid passage 520 may include/comprise a restrictor that controls or regulates a flow of print fluid between manifold 510 and pressure chamber 412 along channel fluid passage 520. Pressure chamber 412 of the jetting channel 402 is also fluidly coupled to manifold 511 through a channel fluid passage 521.

Manifold 514 of printhead 104 is fluidly coupled to a jetting channel 402 of row 502. More particularly, pressure chamber 412 of the jetting channel 402 is fluidly coupled to manifold 514 through a channel fluid passage 520. In an embodiment, the channel fluid passage 520 may include/comprise a restrictor that controls a flow of print fluid between manifold 514 and pressure chamber 412 along channel fluid passage 520. Pressure chamber 412 of the jetting channel 402 is also fluidly coupled to manifold 515 through a channel fluid passage 521.

As illustrated in FIG. 6A, row 501 of jetting channels 402 and row 502 of jetting channels 402 are adjacent to one another within printhead 104, and are separated by a longitudinal centerline 310. Manifolds 511 and 515 are disposed in an intermediate region 550 of printhead 104/plate stack 232 between the rows 501-502 of jetting channels 402. More particularly, manifolds 511 and 515 are disposed between pressure chambers 412 of jetting channels 402 in adjacent rows 501-502. For jetting channel 402 in row 501, manifold 510 is disposed on one side of pressure chamber 412 (along the y-axis) in an outer region 652 of printhead 104/plate stack 232 between the row 501 of jetting channels 402 and a longitudinal side 312. Manifold 510 is fluidly coupled to the pressure chamber 412 via channel fluid passage 520 that is also disposed in outer region 652. Manifold 511 is disposed on the other side of the pressure chamber 412 (in relation to manifold 510) along the y-axis in the intermediate region 550. Manifold 511 is disposed between the pressure chamber 412 and the longitudinal centerline 310, and may be fluidly isolated from manifold 515 and/or jetting channels 402 in row 502.

For jetting channel 402 in row 502, manifold 514 is disposed on one side of pressure chamber 412 (along the y-axis) in an outer region 654 of printhead 104/plate stack 232 between the row 502 of jetting channels 402 and a longitudinal side 313. Manifold 514 is fluidly coupled to the pressure chamber 412 via channel fluid passage 520 that is also disposed in outer region 654. Manifold 515 is disposed on the other side of the pressure chamber 412 (in relation to manifold 514) along the y-axis in the intermediate region 550. Manifold 515 is disposed between the pressure chamber 412 and the longitudinal centerline 310, and may be fluidly isolated from manifold 511 and/or jetting channels 402 in row 501.

FIG. 6B shows a cross-section of a jetting channel 402 in row 501. The arrows in FIG. 6B illustrate a flow of a print fluid from manifold 510 to jetting channel 402, and from jetting channel 402 to manifold 511. The print fluid 680 flows from manifold 510 and into pressure chamber 412 through channel fluid passage 520. One wall of pressure chamber 412 is formed with diaphragm 410 that physically interfaces with actuator 416. Diaphragm 410 may comprise a sheet of semi-flexible material that vibrates in response to actuation by actuator 416. To jet from jetting channel 402, one or more jetting pulses are sent to actuator 416, which actuates or "fires" in response to the jetting pulses. Firing of actuator 416 creates pressure waves in pressure chamber 412 that cause jetting of one or more droplets from nozzle 306. The non-jetted print fluid 682, which is not jetted from nozzle 306, flows from pressure chamber 412 into manifold 511 through channel fluid passage 521.

Figure 7:
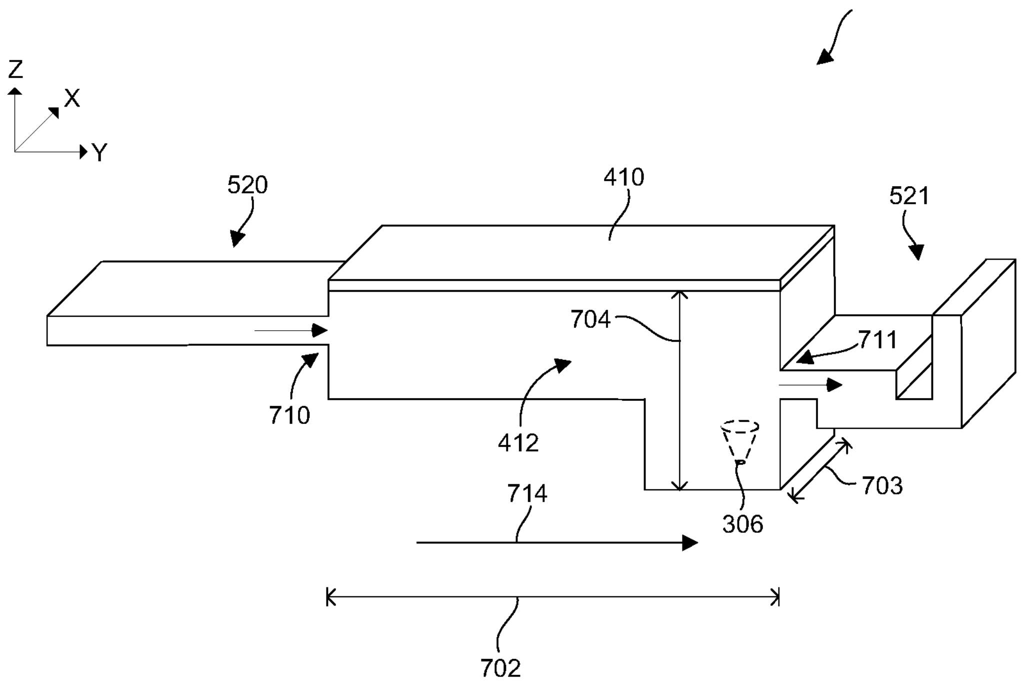
FIG. 7 is a perspective view of a jetting channel in an illustrative embodiment.

FIG. 7 is a perspective view of a jetting channel 402 in an illustrative embodiment. As above, jetting channel 402 includes pressure chamber 412, diaphragm 410, and a nozzle 306. Pressure chamber 412 has a length 702 (i.e., along the y-axis), a width 703 (i.e., along the x-axis), and a height 704 (i.e., along the z-axis). Jetting channel 402 also includes channel fluid passages 520-521. In general, the major flow of print fluid flows longitudinally or lengthwise through jetting channel 402 along the y-axis. In an embodiment of a flow in a flow direction 714, print fluid flows into one side 710 (i.e., a first side) of pressure chamber 412 through channel fluid passage 520. The print fluid (i.e., non-jetted print fluid) flows out of the opposite side 711 (i.e., second side) of pressure chamber 412 through channel fluid passage 521. Thus, the print fluid flows into and out of pressure chamber 412 via channel fluid passage 520 and channel fluid passage 521 in a same lengthwise direction (i.e., along the y-axis) of the jetting channel 402. Further, the first side 710 of pressure chamber 412 is disposed closer to a longitudinal side 312-313 of printhead 104 than the second side 711, and the second side 711 is disposed closer to an intermediate region 550 of printhead 104 than the first side 710 (see FIG. 6A). In this structure, channel fluid passage 520 and channel fluid passage 521 are disposed on opposite sides 710-711 of the pressure chamber 412 in the lengthwise direction. For example, channel fluid passage 520 and channel fluid passage 521 are disposed on opposite sides 710-711 of the pressure chamber 412 in relation to nozzle 306. It is noted again that the flow direction 714 may be reversed in other embodiments.

A jetting channel 402 as shown in FIGS. 4, 6A-6B, and 7 are examples to illustrate a basic structure of a jetting channel, such as the diaphragm, pressure chamber, nozzle, and channel fluid passages. Other types of jetting channels are also considered herein. For example, some jetting channels may have a pressure chamber having a different shape than is illustrated in FIGS. 4, 6A-6B, and 7, some jetting channels may have a channel fluid passage 521 having a different shape than is illustrated in FIGS. 6A-6B and 7, etc.

Figure 8:
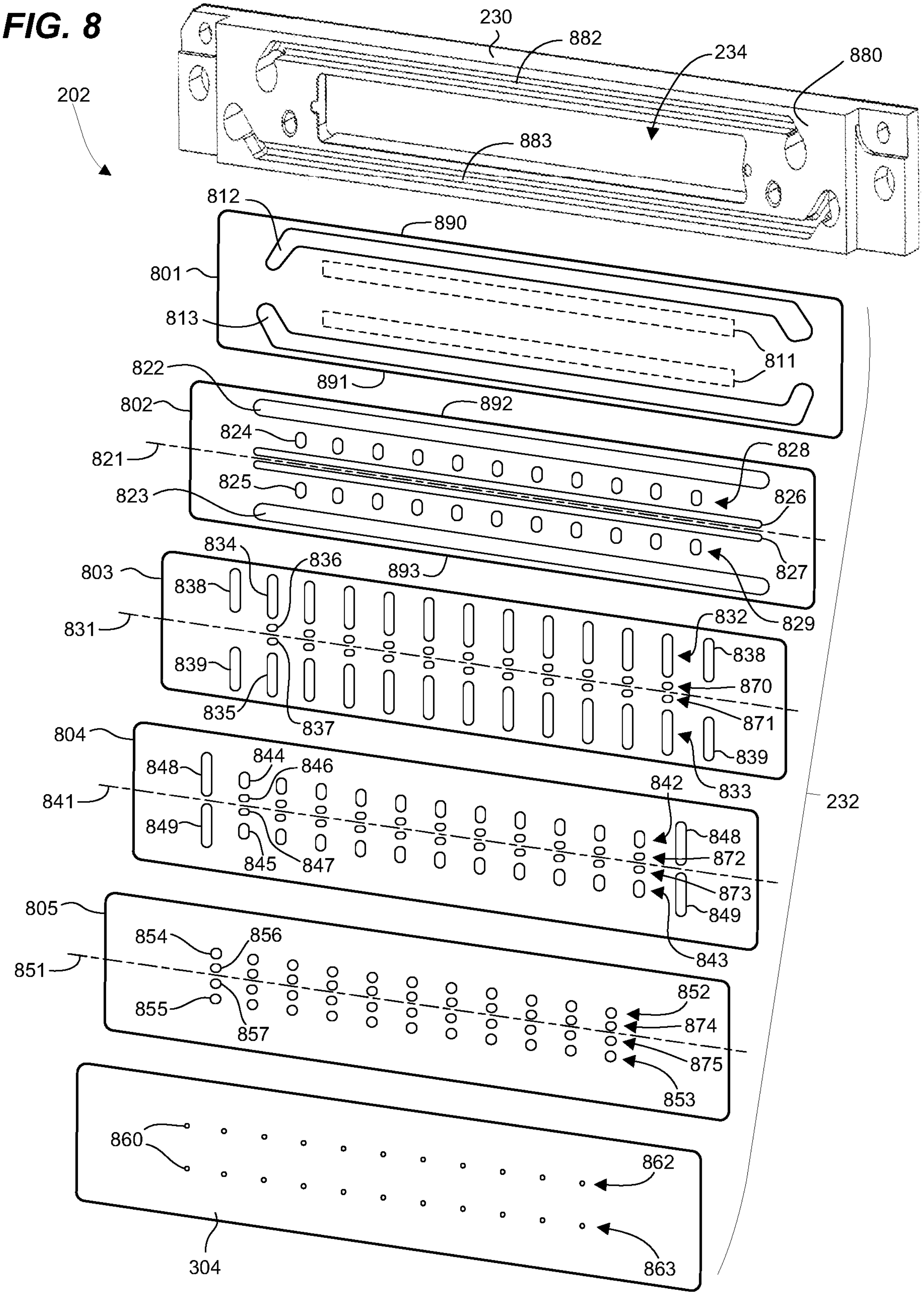
FIG. 8 illustrates an exploded, perspective view of a head member of a printhead in an illustrative embodiment.

FIG. 8 illustrates an exploded, perspective view of a head member 202 of a printhead 104 in an illustrative embodiment. In this embodiment, head member 202 is an assembly that includes housing 230 and plate stack 232. Plate stack 232 is affixed or attached to an interface surface 880 of housing 230, and forms rows of jetting channels 402. Housing 230 is an elongated member made from a rigid material, such as stainless steel. Housing 230 has a length, a width, and a height, and the dimensions of housing 230 are such that the length is greater than the width. The direction of a row of jetting channels 402 corresponds with the length of housing 230. Housing 230 includes access hole 234 at or near its center that extends from I/O surface (not visible) through to an opposing interface surface 880. Access hole 234 provides passage way for an actuator assembly (not shown), such as a plurality of piezoelectric actuators, to pass through and contact diaphragms 410 of the jetting channels 402. Interface surface 880 is the surface of housing 230 that faces plate stack 232, and interfaces with a plate of plate stack 232. Housing 230 also includes manifold ducts 882-883 that extend longitudinally along a length of interface surface 880. A manifold duct 882-883 comprises an elongated cut or groove along interface surface 880 that is configured to convey a print fluid, and forms at least a portion of a manifold for printhead 104.

Plate stack 232 includes a series of plates 801-805 and 304 that are fixed or bonded to one another to form a laminated plate structure. Plate stack 232 illustrated in FIG. 8 is intended to be an example of a basic structure of a printhead. There may be additional plates of plate stack 232 that are not shown in FIG. 8, and the configuration of the various plates may vary as desired. Also, FIG. 8 is not drawn to scale.

In an embodiment, plate stack 232 includes the following plates: a diaphragm plate 801, a support plate 802, a restrictor plate 803, chamber plates 804-805, and a nozzle plate 304. Diaphragm plate 801 is a thin sheet of material (e.g., metal (i.e., stainless steel), plastic, etc.) that is generally rectangular in shape and is substantially flat or planar. Diaphragm plate 801 includes diaphragms 811 comprising a sheet of a semi-flexible material that forms the diaphragms 410 of the jetting channels 402. Diaphragm plate 801 further includes manifold openings 812-813. A manifold opening is an aperture or hole that forms at least part of a manifold for jetting channels 402 in a row. Manifold opening 812 extends longitudinally along diaphragm plate 801 between a longitudinal side 890 of diaphragm plate 801 and diaphragms 811 for a row of jetting channels 402, and is fluidly coupled with a manifold duct 882 of housing 230. Manifold opening 813 extends longitudinally along diaphragm plate 801 between the other longitudinal side 891 of diaphragm plate 801 and diaphragms 811 for another row of jetting channels 402, and is fluidly coupled with a manifold duct 883 of housing 230.

Support plate 802 (also referred to as a spacer plate) is a thin sheet of material (e.g., metal (i.e., stainless steel), plastic, etc.) that is generally rectangular in shape and is substantially flat or planar. Support plate 802 includes manifold openings 822-823, chamber openings 824-825, and manifold openings 826-827. Chamber openings 824 comprise apertures or holes generally aligned longitudinally in a linear row 828, and configured to form at least part of the pressure chambers 412 in a first row 501 of jetting channels 402. Manifold opening 822 is an elongated opening that extends longitudinally along support plate 802 between a longitudinal side 892 of support plate 802 and chamber openings 824 in linear row 828, and generally in parallel with the linear row 828 of chamber openings 824. Manifold opening 826 is an elongated opening that extends longitudinally along support plate 802 between the linear row 828 of chamber openings 824 and a longitudinal centerline 821 of support plate 802, and generally in parallel with the linear row 828 of chamber openings 824. Chamber openings 825 comprise apertures or holes generally aligned longitudinally in a linear row 829, and configured to form at least part of the pressure chambers 412 for a second (adjacent) row 502 of jetting channels 402. Manifold opening 823 is an elongated opening that extends longitudinally along support plate 802 between the other longitudinal side 893 of support plate 802 and chamber openings 825 in linear row 829, and generally in parallel with the linear row 829 of chamber openings 825. Manifold opening 827 is an elongated opening that extends longitudinally along support plate 802 between the linear row 829 of chamber openings 825 and the longitudinal centerline 821 of support plate 802, and generally in parallel with the linear row 829 of chamber openings 825.

Restrictor plate 803 is a thin sheet of material (e.g., metal (i.e., stainless steel), plastic, etc.) that is generally rectangular in shape and is substantially flat or planar. Restrictor plate 803 includes restrictor openings 834-835 and channel connector openings 836-837. Restrictor openings 834 are elongated apertures or holes each oriented transversely, and generally aligned longitudinally in a linear row 832. Restrictor openings 834 are configured to fluidly couple pressure chambers 412 of a first row 501 of jetting channels 402 with a manifold (i.e., formed by manifold opening 822, manifold opening 812, etc.). Restrictor openings 834 at least in part define restrictors (or a channel fluid passage 520) for individual jetting channels 402 in the first row 501. Thus, restrictor openings 834 are each configured to fluidly couple an individual one of the pressure chambers 412 of the jetting channels 402 in the first row 501 with a manifold (e.g., manifold 510). Channel connector openings 836 comprise apertures or holes generally aligned in a linear row 870 in parallel with the linear row 832 of restrictor openings 834. Channel connector openings 836 are disposed between restrictor openings 834 and a longitudinal centerline 831 of restrictor plate 803. Channel connector openings 836 are configured to fluidly couple pressure chambers 412 of jetting channels 402 in a first row 501 with a manifold (i.e., formed by manifold opening 826). Restrictor openings 835 are elongated apertures or holes each oriented transversely, and generally aligned longitudinally in a linear row 833. Restrictor openings 835 are configured to fluidly couple pressure chambers 412 of jetting channels 402 in a second row 502 with a manifold (i.e., formed by manifold opening 823, manifold opening 813, etc.). Restrictor openings 835 at least in part define restrictors for individual jetting channels 402 in the second row 502. Thus, restrictor openings 835 are each configured to fluidly couple an individual one of the pressure chambers 412 of the jetting channels 402 in the second row 502 with a manifold (e.g., manifold 514). Channel connector openings 837 comprise apertures or holes generally aligned in a linear row 871 in parallel with the linear row 833 of restrictor openings 835. Channel connector openings 837 are disposed between restrictor openings 835 and the longitudinal centerline 831 of restrictor plate 803. Channel connector openings 837 are configured to fluidly couple pressure chambers 412 of jetting channels 402 in a second row 502 with a manifold (i.e., formed by manifold opening 827). Restrictor plate 803 further includes inter-manifold openings 838-839. Inter-manifold openings 838 are elongated apertures or holes each oriented transversely, and at least in part form an inter-manifold fluid passage 512 configured to fluidly couple two manifolds. Inter-manifold openings 839 are elongated apertures or holes each oriented transversely, and at least in part form an inter-manifold fluid passage 516 configured to fluidly couple two manifolds.

Chamber plate 804 is a thin sheet of material (e.g., metal (i.e., stainless steel), plastic, etc.) that is generally rectangular in shape and substantially flat or planar. Chamber plate 804 includes chamber openings 844-845 and channel connector openings 846-847. Chamber openings 844 are apertures or holes generally aligned longitudinally in a linear row 842, and form at least part of the pressure chambers 412 of jetting channels 402 in a first row 501. Channel connector openings 846 comprise apertures or holes generally aligned in a linear row 872 in parallel with the linear row 842 of chamber openings 844. Channel connector openings 846 are disposed between chamber openings 844 and a longitudinal centerline 841 of chamber plate 804. Channel connector openings 846 are each configured to fluidly couple an individual pressure chambers 412 of jetting channels 402 in a first row 501 with a manifold (i.e., formed by manifold opening 826), and therefore at least in part form a channel fluid passage 521. Chamber openings 845 are apertures or holes generally aligned longitudinally in a linear row 843, and form at least part of the pressure chambers 412 of jetting channels 402 in a second row 502. Channel connector openings 847 comprise apertures or holes generally aligned in a linear row 873 in parallel with the linear row 843 of chamber openings 845. Channel connector openings 847 are disposed between chamber openings 845 and the longitudinal centerline 841 of chamber plate 804. Channel connector openings 847 are each configured to fluidly couple an individual pressure chamber 412 of jetting channels 402 in a second row 502 with a manifold (i.e., formed by manifold opening 827), and therefore at least in part form a channel fluid passage 521. Chamber plate 804 further includes inter-manifold openings 848-849. Inter-manifold openings 848 are elongated apertures or holes each oriented transversely, and at least in part form an inter-manifold fluid passage 512 configured to fluidly couple two manifolds. Inter-manifold openings 849 are elongated apertures or holes each oriented transversely, and at least in part form an inter-manifold fluid passage 516 configured to fluidly couple two manifolds.

Chamber plate 805 is a thin sheet of material (e.g., metal (i.e., stainless steel), plastic, etc.) that is generally rectangular in shape and substantially flat or planar. Chamber plate 805 includes chamber openings 854-855 and channel connector features 856-857. Chamber openings 854 are apertures or holes generally aligned longitudinally in a linear row 852, and form at least part of the pressure chambers 412 of jetting channels 402 in a first row 501. Channel connector features 856 may comprise apertures, holes, etches, etc., generally aligned in a linear row 874 in parallel with the linear row 852 of chamber openings 854. Channel connector features 856 are disposed between chamber openings 854 and a longitudinal centerline 851 of chamber plate 805. Channel connector features 856 are each configured to fluidly couple an individual pressure chamber 412 of jetting channels 402 in a first row 501 with a manifold (i.e., formed by manifold opening 826), and therefore at least in part form a channel fluid passage 521. Chamber openings 855 are apertures or holes generally aligned longitudinally in a linear row 853, and form at least part of the pressure chambers 412 of jetting channels 402 in a second row 502. Channel connector features 857 comprise apertures, holes, etches, etc., generally aligned in a linear row 875 in parallel with the linear row 853 of chamber openings 855. Channel connector features 857 are disposed between chamber openings 855 and the longitudinal centerline 851 of chamber plate 805. Channel connector features 857 are each configured to fluidly couple an individual pressure chamber 412 of jetting channels 402 in a second row 502 with a manifold (i.e., formed by manifold opening 827), and therefore at least in part form a channel fluid passage 521. Channel connector features 856-857 are referred to generally as "features" as they may comprise a hole, a partial etch, etc.

Nozzle plate 304 is a thin sheet of material (e.g., metal (i.e., stainless steel), plastic, etc.) that is generally rectangular in shape and is substantially flat or planar. Nozzle plate 304 includes apertures or nozzle holes 860 that form nozzles 306 of the jetting channels 402. For example, nozzle holes 860 may be generally aligned longitudinally in a linear row 862 to form the nozzles 306 of jetting channels 402 in a first row 501, and may be generally aligned longitudinally in a linear row 863 to form the nozzles 306 of jetting channels 402 in a second row 502. One technical benefit of plate stack 232 is flow-through jetting channels may be formed with a reduced number of plates.

Figure 9:
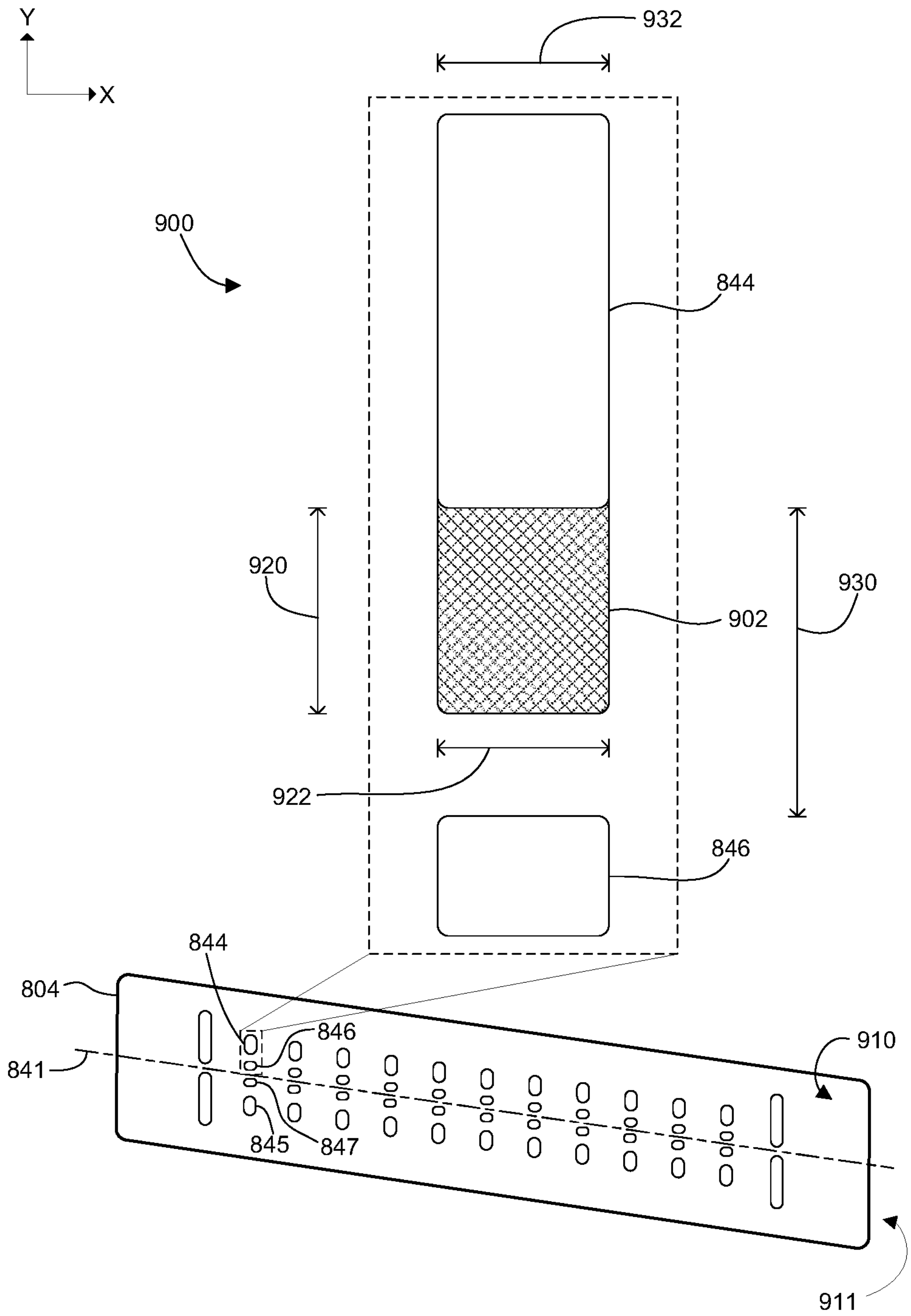
FIG. 9 illustrates a chamber plate in an illustrative embodiment.

In an embodiment, one or both of chamber plates 804-805 may be etched or otherwise patterned to form channel fluid passages 521. FIG. 9 illustrates chamber plate 804 in an illustrative embodiment. As described above, chamber plate 804 is a substantially flat or planar sheet of material, and thus has opposing planar surfaces 910-911. Planar surface 910 faces toward the discharge surface 220 of the printhead 104, while planar surface 911 faces toward housing 230. Zoom window 900 illustrates a magnified view of a chamber opening 844 and a channel connector opening 846 of chamber plate 804. Chamber opening 844 is an elongated opening etched or cut into chamber plate 804, and channel connector opening 846 is an opening etched or cut into chamber plate 804 between chamber opening 844 and the longitudinal centerline 841 of chamber plate 804. In an embodiment, chamber plate 804 further includes a partially-etched segment 902 that extends part way from chamber opening 844 toward channel connector opening 846. To form partially-etched segment 902, chamber plate 804 is partially etched from planar surface 910 to an etching depth less than the thickness of chamber plate 804. For example, partially-etched segment 902 may comprise a "half-etch" where the etching depth is about half the thickness of chamber plate 804. Thus, partially-etched segment 902 does not form a hole through chamber plate 804. Partially-etched segment 902 begins at chamber opening 844 and extends along a length 920 (i.e., along the y-axis) toward channel connector opening 846. In an embodiment, the length 920 of partially-etched segment 902 is less than a distance 930 between chamber opening 844 and channel connector opening 846. A width 922 (i.e., along the x-axis) of partially-etched segment 902 may correspond with a width 932 of chamber opening 844. A partially-etched segment 902 may be etched between each chamber opening 844-845 and channel connector opening 846-847 of chamber plate 804 in a similar manner. One technical benefit is channel fluid passages 521 may be patterned using existing lithography processes.

Figure 10:
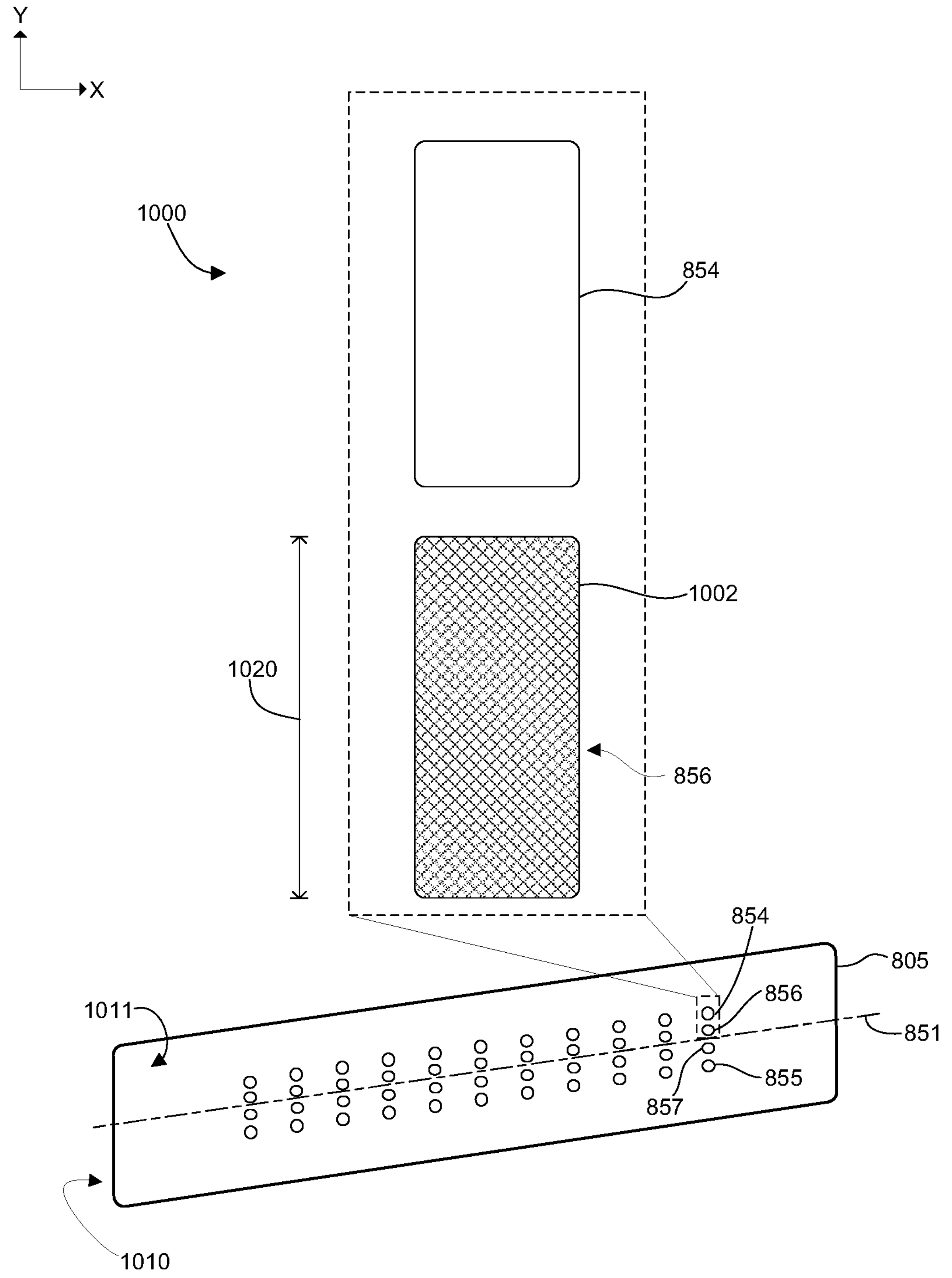
FIG. 10 illustrates a chamber plate in an illustrative embodiment.

FIG. 10 illustrates chamber plate 805 in an illustrative embodiment. As described above, chamber plate 805 is a substantially flat or planar sheet of material, and thus has opposing planar surfaces 1010-1011. Planar surface 1010 faces toward the discharge surface 220 of the printhead 104, while planar surface 1011 faces toward housing 230. Zoom window 1000 illustrates a magnified view of a chamber opening 854 and a channel connector feature 856 of chamber plate 805. Chamber opening 854 is an opening etched or cut into chamber plate 805. In an embodiment, channel connector feature 856 comprises a partially-etched segment 1002 in chamber plate 805. To form partially-etched segment 1002, chamber plate 805 is partially etched from planar surface 1011 to an etching depth less than the thickness of chamber plate 805. For example, partially-etched segment 1002 may comprise a "half-etch" where the etching depth is about half the thickness of chamber plate 805. Thus, partially-etched segment 1002 does not form a hole through chamber plate 805. Partially-etched segment 1002 extends along a length 1020 (i.e., along the y-axis) between the longitudinal centerline 851 of chamber plate 805 and chamber opening 854. Each of the channel connector features 856 of chamber plate 805 may comprise a partially-etched segment 1002 as described above. In other embodiments, channel connector features 856 may comprise holes, holes and partially-etched segments, etc. One technical benefit is channel fluid passages 521 may be patterned using existing lithography processes.

The configuration of plate stack 232 in FIGS. 8-10 is provided as an example, and other configurations are considered herein.

Figure 11:
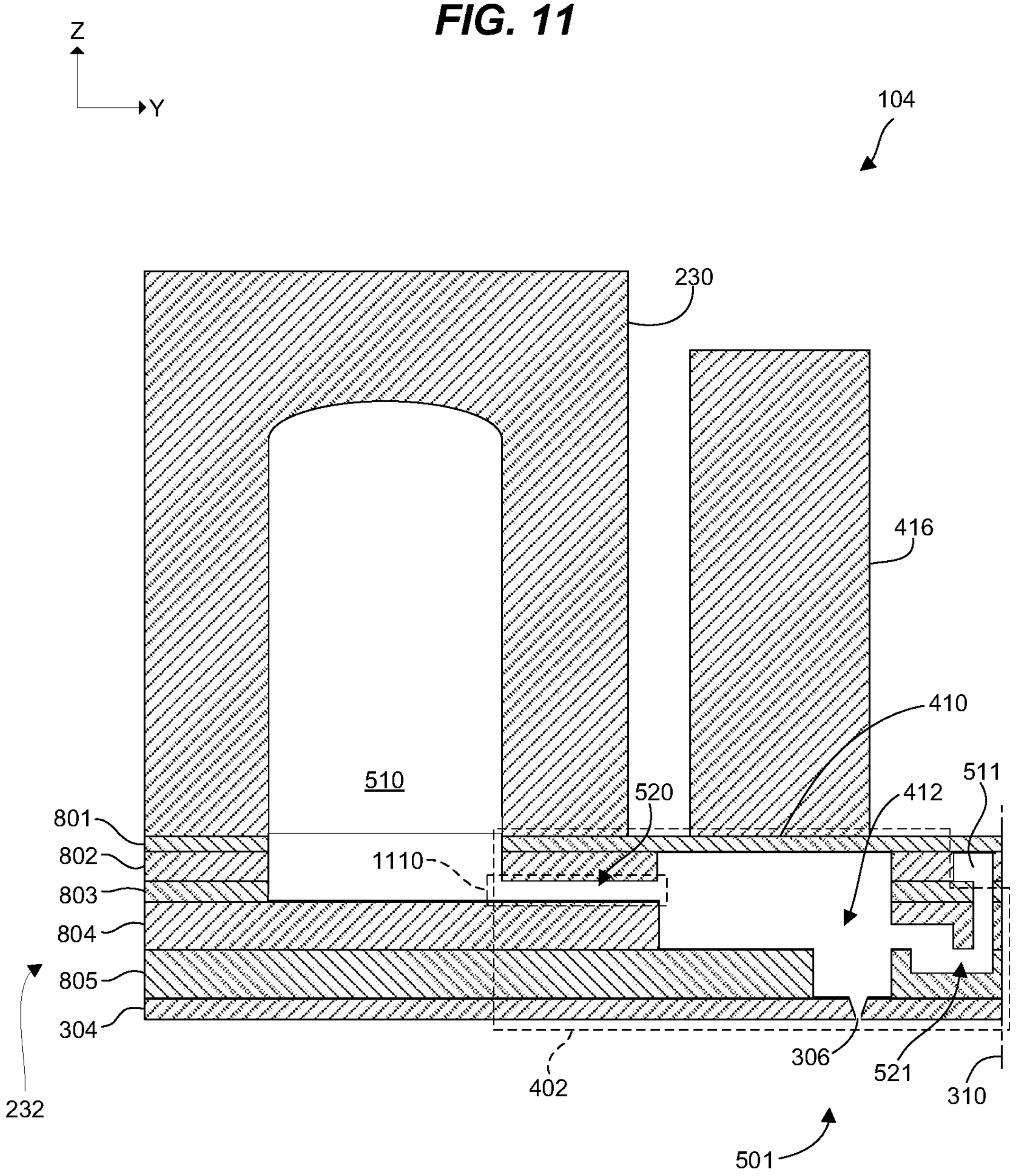
FIG. 11 is a cross-sectional view of a portion of a printhead in an illustrative embodiment.

FIG. 11 is a cross-sectional view of a portion of a printhead 104 in an illustrative embodiment with a plate stack 232 as in FIGS. 8-10. FIG. 11 shows a cross-section of printhead 104 along cut-plane 6-6 in FIG. 3 to show a jetting channel 402 in row 501. Printhead 104 includes housing 230 and plate stack 232 affixed or attached to housing 230 to form jetting channels 402. As above, plate stack 232 includes diaphragm plate 801, support plate 802, restrictor plate 803, chamber plates 804-805, and nozzle plate 304. A nozzle hole 860 of nozzle plate 304 defines the nozzle 306 of the jetting channel 402 (see also, FIG. 8). A chamber opening 854 of chamber plate 805, a chamber opening 844 of chamber plate 804, a restrictor opening 834 of restrictor plate 803, and a chamber opening 824 of support plate 802 form or define the pressure chamber 412 of the jetting channel 402. The restrictor opening 834, in conjunction with chamber plate 804 and support plate 802, form or define a restrictor 1110 that comprises the channel fluid passage 520 configured to control or regulate a flow of print fluid between manifold 510 and pressure chamber 412. Manifold openings 812 and 822 of diaphragm plate 801 and support plate 802, in conjunction with manifold duct 882 of housing 230, form or define manifold 510. Although not shown in FIG. 11, manifold openings 813 and 823 of diaphragm plate 801 and support plate 802, in conjunction with manifold duct 883 of housing 230, form or define manifold 514 as shown in FIGS. 6A and 8. Manifold opening 826 of support plate 802 defines manifold 511. Channel connector opening 836 of restrictor plate 803, channel connector opening 846 of chamber plate 804, and channel connector feature 856 of chamber plate 805 form or define the channel fluid passage 521 between the pressure chamber 412 and manifold 511. Although not shown in FIG. 11, manifold opening 827 of support plate 802 defines manifold 515 as shown in FIGS. 6A and 8. Channel connector opening 837 of restrictor plate 803, channel connector opening 847 of chamber plate 804, and channel connector feature 857 of chamber plate 805 form or define the channel fluid passage 521 between the pressure chamber 412 and manifold 515 as shown in FIGS. 6A and 8. In an embodiment, manifold 511 and manifold 515 are formed by the support plate 802. In an embodiment, manifold 510 and manifold 514 are formed by at least the support plate 802.

One technical benefit of the structure of printhead 104 disclosed above is print fluid may be circulated through jetting channels 402 by routing non-jetting print fluid toward the center of the printhead 104, which avoids drying or sedimentation of the print fluid within the jetting channels 402. Another benefit is the channel fluid passages 521 disposed toward the center of the printhead 104 are shorter conduits than other designs, which results in smaller fluidic resistance and faster exit of non-jetted print fluid from the jetting channels 402 (i.e., faster circulation time). This design also allows for fewer plates of plate stack 232, which reduces manufacturing costs and allows for higher-frequency jetting.

Figure 12:
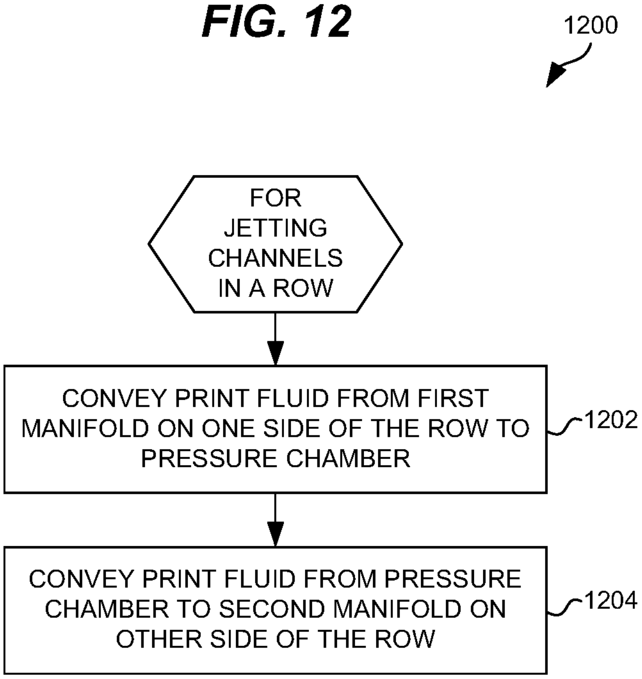
FIG. 12 is a flow chart illustrating a method of operating a printhead in an illustrative embodiment.

FIG. 12 is a flow chart illustrating a method 1200 of operating a printhead 104 in an illustrative embodiment. The steps of method 1200 will be described with reference to printhead 104 in FIG. 5A, but those skilled in the art will appreciate that method 1200 may be performed by other printheads. Also, the steps of the flow charts described herein are not all inclusive and may include other steps not shown, and the steps may be performed in an alternative order.

For method 1200, it is assumed that printhead 104 includes a row 501 of jetting channels 402 fluidly coupled to manifolds 510-511 disposed on opposite sides of row 501. For each jetting channel 402 in row 501 (or a subset of jetting channels 402 in row 501), a print fluid is conveyed from manifold 510 (i.e., a first manifold) to the pressure chamber 412 (step 1202), such as through the individual channel fluid passage 520 for that jetting channel 402. Non-jetted print fluid is conveyed from the pressure chamber 412 to manifold 511 (i.e., a second manifold) (step 1204), such as through the individual channel fluid passage 521 for that jetting channel 402.

In step 1204, the non-jetted print fluid may flow out of the pressure chamber 412 toward manifold 511 in the same direction (i.e., along the y-axis) that the print fluid flowed into the pressure chamber 412 from manifold 510. In FIG. 7, for example, the print fluid flows into the pressure chamber 412 in the direction indicated by the arrows (i.e., from left to right), and the non-jetted print fluid flows out of the pressure chamber 412 in the same direction. Thus, the print fluid may flow into and out of the pressure chamber 412 via channel fluid passage 520 and channel fluid passage 521 in the same lengthwise direction (i.e., along the y-axis) of a jetting channel 402. Also, for step 1204, print fluid may flow into one side 710 (i.e., a first side) of pressure chamber 412 through channel fluid passage 520, and flow out of the opposite side 711 (i.e., second side) of pressure chamber 412 through channel fluid passage 521, as indicated in FIG. 7. One technical benefit of conveying print fluid into and out of a pressure chamber 412 from opposite sides of a row 501 is the non-jetted print fluid does not need to re-routed in the opposite direction (i.e., along the y-axis), which results in smaller fluidic resistance and faster exit of non-jetted print fluid from the jetting channels 402 (i.e., faster circulation time).

In printheads, such as printhead 104 disclosed above, nozzle failures may occur due to a variety of factors, such as drying of print fluid at a nozzle or meniscus, sedimentation of the print fluid, bubbles present in the print fluid, etc. These and other nozzle failures may result in poor print quality. Thus, it may be beneficial to mix or stir the print fluid in individual jetting channels 402.

Intra-Channel Passive Mixer

Figure 13:
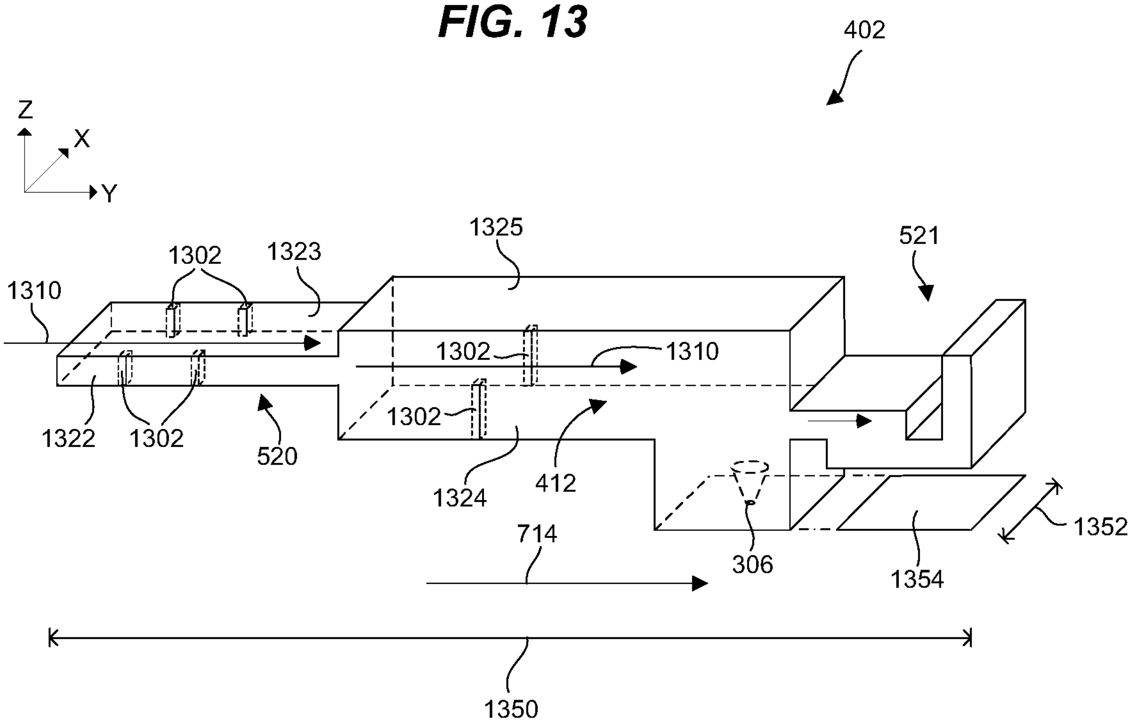
FIG. 13 is a perspective view of a jetting channel with one or more intra-channel passive mixers in an illustrative embodiment.

In an embodiment, one or more intra-channel passive mixers may be implemented in jetting channels 402. FIG. 13 is a perspective view of a jetting channel 402 with one or more intra-channel passive mixers 1302 in an illustrative embodiment. The diaphragm 410 has been removed in FIG. 13. In general, a print fluid flows longitudinally or lengthwise along jetting channel 402 (i.e., along the y-axis). Each jetting channel 402 has a length 1350 along the y-axis, and print fluid flows along the length 1350 of the jetting channel 402 in what is generally referred to as a longitudinal flow. In an embodiment along a flow direction 714, for example, the print fluid flows through channel fluid passage 520 (e.g., from manifold 510) into pressure chamber 412. The print fluid also flows along pressure chamber 412 where the print fluid is jetted from nozzle 306 or is circulated through channel fluid passage 521. Therefore, channel fluid passage 520 and pressure chamber 412 may each comprise a longitudinal flow path 1310 for print fluid along the length 1350 of the jetting channel 402.

Each jetting channel 402 includes vertical side walls along the z-axis. A vertical side wall of a jetting channel 402 is generally perpendicular or transverse to a plane 1354 of the discharge surface 220 of the printhead 104. Print fluid jets from a nozzle 306 of a jetting channel 402 generally along the z-axis, and a vertical side wall of a jetting channel 402 is parallel to the jetting direction of the jetting channel 402. For example, channel fluid passage 520 of the jetting channel 402 includes opposing vertical side walls 1322-1323, and pressure chamber 412 includes opposing vertical side walls 1324-1325. In an embodiment, one or more intra-channel passive mixers 1302 may be disposed in the jetting channel 402. An intra-channel passive mixer 1302 comprises a protuberance, projection, rib, or other structural element within a jetting channel that projects or protrudes (e.g., horizontally along the x-axis) from a vertical side wall of the jetting channel into a longitudinal flow path 1310 of print fluid along the length 1350 of the jetting channel. Thus, an intra-channel passive mixer 1302 projects across the width of 1352 of a jetting channel 402.

In an embodiment, one or more intra-channel passive mixers 1302 may be disposed at channel fluid passage 520 (e.g., at restrictor 1110). Thus, one or more intra-channel passive mixers 1302 may project from a vertical side wall(s) 1322-1323 of channel fluid passage 520. One technical benefit of implementing intra-channel passive mixers 1302 in channel fluid passage 520 is the print fluid is mixed before entering the pressure chamber 412. In an embodiment, one or more intra-channel passive mixers 1302 may be disposed at pressure chamber 412. Thus, one or more intra-channel passive mixers 1302 may project from a vertical side wall(s) 1324-1325 of pressure chamber 412. One technical benefit of implementing intra-channel passive mixers 1302 in pressure chamber 412 is the print fluid is mixed within the pressure chamber 412. In an embodiment, intra-channel passive mixers 1302 may be disposed at channel fluid passage 520 and at pressure chamber 412 as illustrated in FIG. 13. Although a jetting channel 402 may include multiple vertical side walls, intra-channel passive mixers 1302 may project from vertical side walls that are generally parallel to the length 1350 of the jetting channel 402 (i.e., along the y-axis), and generally perpendicular or transverse to a width 1352 of the jetting channel 402 (i.e., along the x-axis) as shown in FIG. 13. Other jetting channels 402 may have a similar configuration with intra-channel passive mixers 1302 as shown in FIG. 13.

Figure 14A:
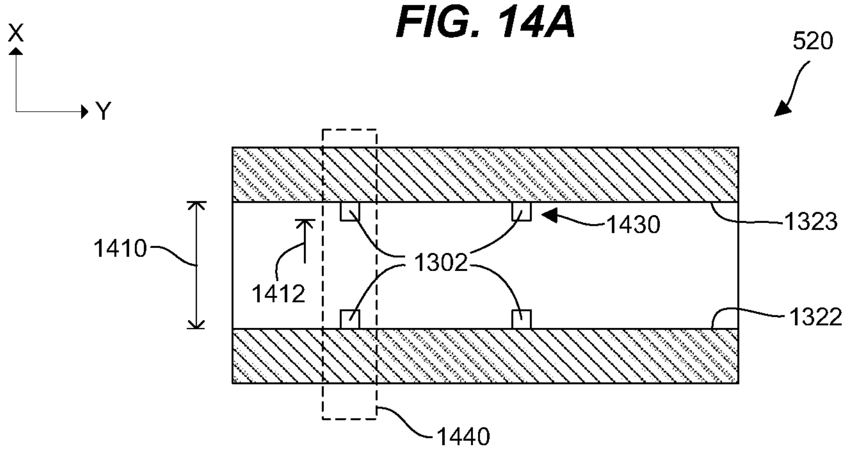
FIGS. 14A-14H are plan views of intra-channel passive mixers of a jetting channel in illustrative embodiments.
Figure 14B:
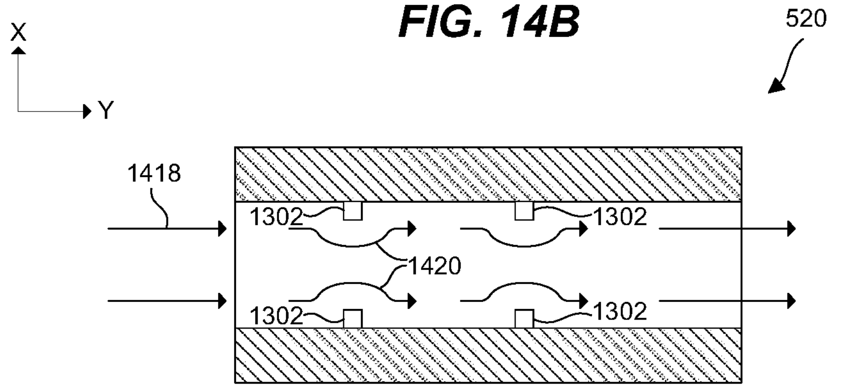

FIGS. 14A-14H are plan views of intra-channel passive mixers 1302 of a jetting channel 402 in illustrative embodiments. FIG. 14A is a plan view of channel fluid passage 520 having a plurality of intra-channel passive mixers 1302. Channel fluid passage 520 has a width 1410 along the x-axis, and each intra-channel passive mixer 1302 extends or projects a distance 1412 inward from a side wall 1322-1323 of channel fluid passage 520. The distance 1412 in which an intra-channel passive mixer 1302 projects inward in the x-direction from a side wall 1322-1323 may be in the range of about 30-70 micrometers, about 10-60% of the width 1410 of channel fluid passage 520, etc. The length of an intra-channel passive mixer 1302 may be about 10-50 micrometers in the y-direction. Each intra-channel passive mixer 1302 may project about the same distance 1412, or the distance 1412 may vary from one intra-channel passive mixer 1302 to another. FIG. 14B is a plan view of channel fluid passage 520 showing a longitudinal flow 1418 of print fluid (illustrated by arrows). In a typical printhead, the flow of print fluid along a jetting channel is a laminar flow (or streamline flow). A laminar flow is a type of fluid flow in which the fluid travels smoothly or in regular paths. As the print fluid flows along channel fluid passage 520 (i.e., from left to right in FIG. 14B) and encounters an intra-channel passive mixer 1302, the intra-channel passive mixer 1302 creates a turbulent flow 1420 in the print fluid (i.e., a locally-turbulent flow proximate to the intra-channel passive mixer 1302). The intra-channel passive mixers 1302 represent obstacles in channel fluid passage 520 that create a turbulent flow 1420 in which the print fluid undergoes irregular fluctuations and mixing. One technical benefit is the print fluid is mixed within channel fluid passage 520 via intra-channel passive mixers 1302 to restore homogeneity of the print fluid.

Figure 14C:
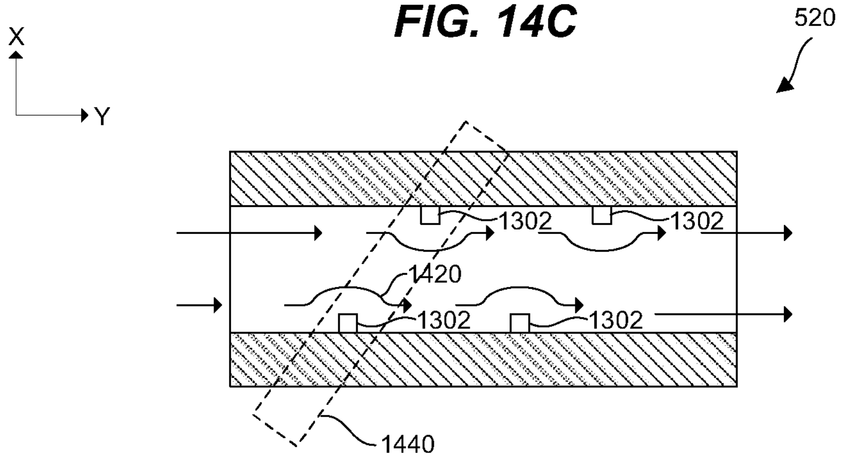
Figure 14D:
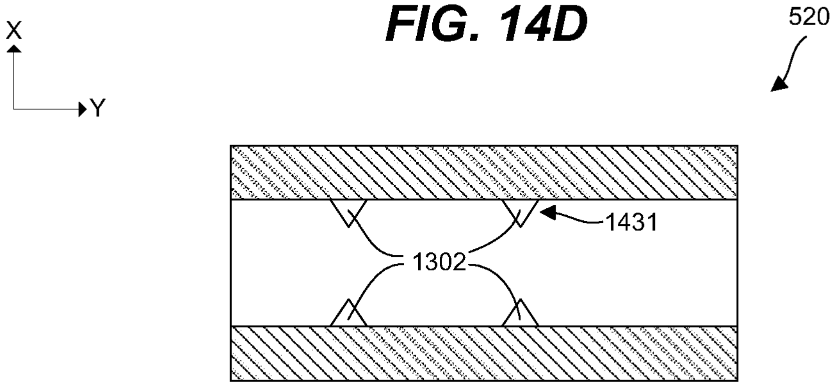
Figure 14E:
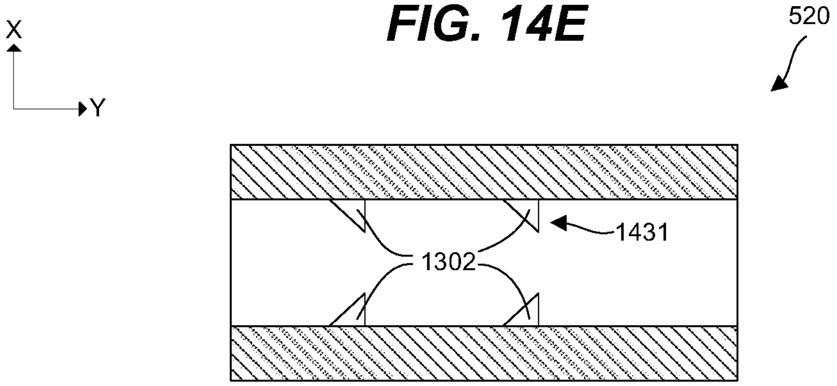
Figure 14F:
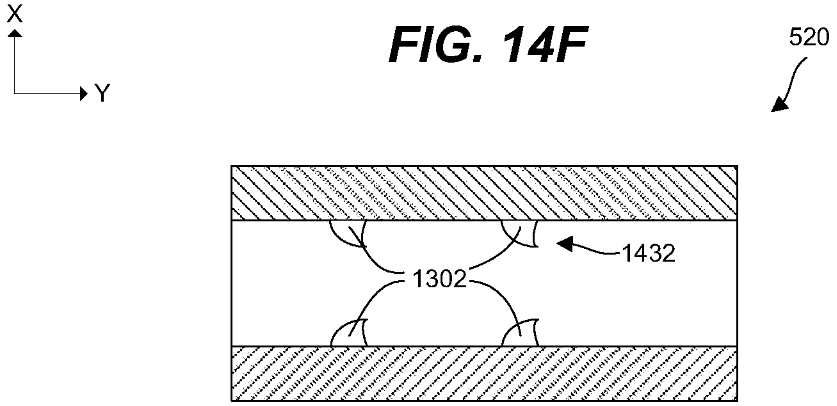
Figure 14G:
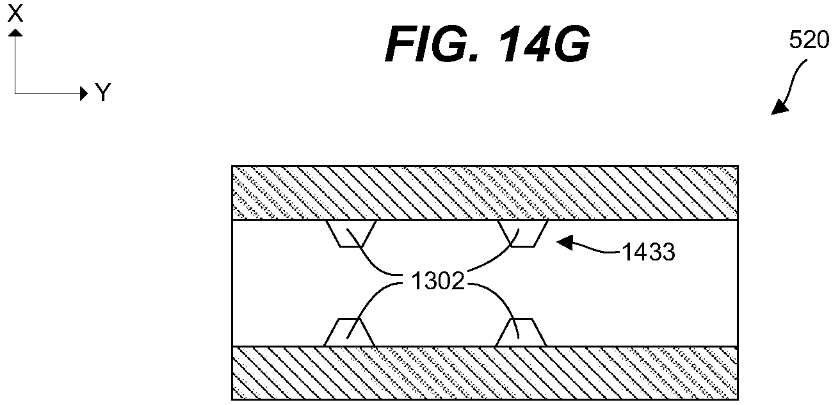
Figure 14H:
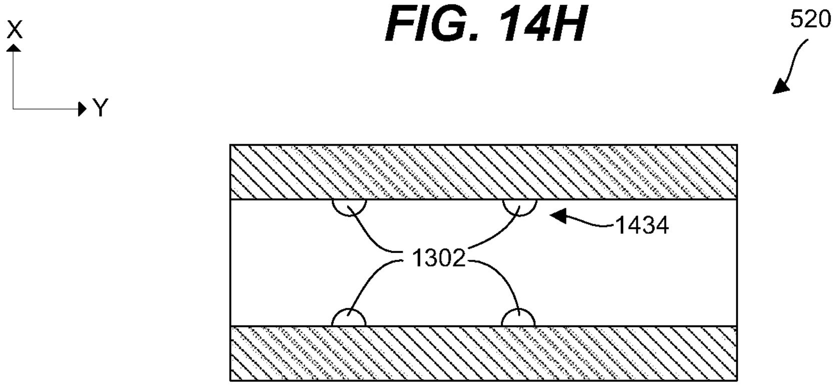

In an embodiment, a pair 1440 of intra-channel passive mixers 1302 may be disposed on opposing side walls 1322-1323 of channel fluid passage 520 as shown in FIG. 14A that are generally aligned across the width 1410 of channel fluid passage 520. In an embodiment, a pair 1440 of intra-channel passive mixers 1302 may be disposed on opposing side walls 1322-1323 and offset or staggered in relation to one another across the width 1410 of channel fluid passage 520, as shown in FIG. 14C. The intra-channel passive mixers 1302 in FIGS. 14A-14C are shown with generally a square or rectangular shape 1430. However, intra-channel passive mixers 1302 may have other shapes in other embodiments. For example, intra-channel passive mixers 1302 may have a generally triangular shape 1431 as shown in FIGS. 14D-14E. Intra-channel passive mixers 1302 may have a generally shark-fin shape 1432 as shown in FIG. 14F. Intra-channel passive mixers 1302 may have a generally trapezoidal shape 1433 as shown in FIG. 14G. Intra-channel passive mixers 1302 may have a generally rounded shape 1434 as shown in FIG. 14H. Any combination of different shapes may be implemented. Also, although four intra-channel passive mixers 1302 are illustrated in FIGS. 14A-14H, the number of intra-channel passive mixers 1302 may vary as desired. For example, the number of intra-channel passive mixers 1302 and their location may depend on the turbulence length scale. For low viscosity print fluid, fewer intra-channel passive mixers 1302 may be needed. For higher viscosity print fluid, more intra-channel passive mixers 1302 may be needed. Also, although intra-channel passive mixers 1302 were shown in channel fluid passage 520 in FIGS. 14A-14H, similar concepts apply when intra-channel passive mixers 1302 are disposed in a pressure chamber 412 of a jetting channel 402, which is not shown for the sake of brevity. Each shape or combination of shapes for the intra-channel passive mixers 1302 provides a technical benefit of creating turbulence in a flow of print fluid to cause mixing of the print fluid. Also, different shapes may be matched to different ink types. For example, heavily pigment-loaded inks in combination with ink viscosity and surface tension may be more suitably matched with the shark-fin shape 1432 than a square or rectangular shape 1430, avoiding pigment piling in a dead spot.

Figure 15:
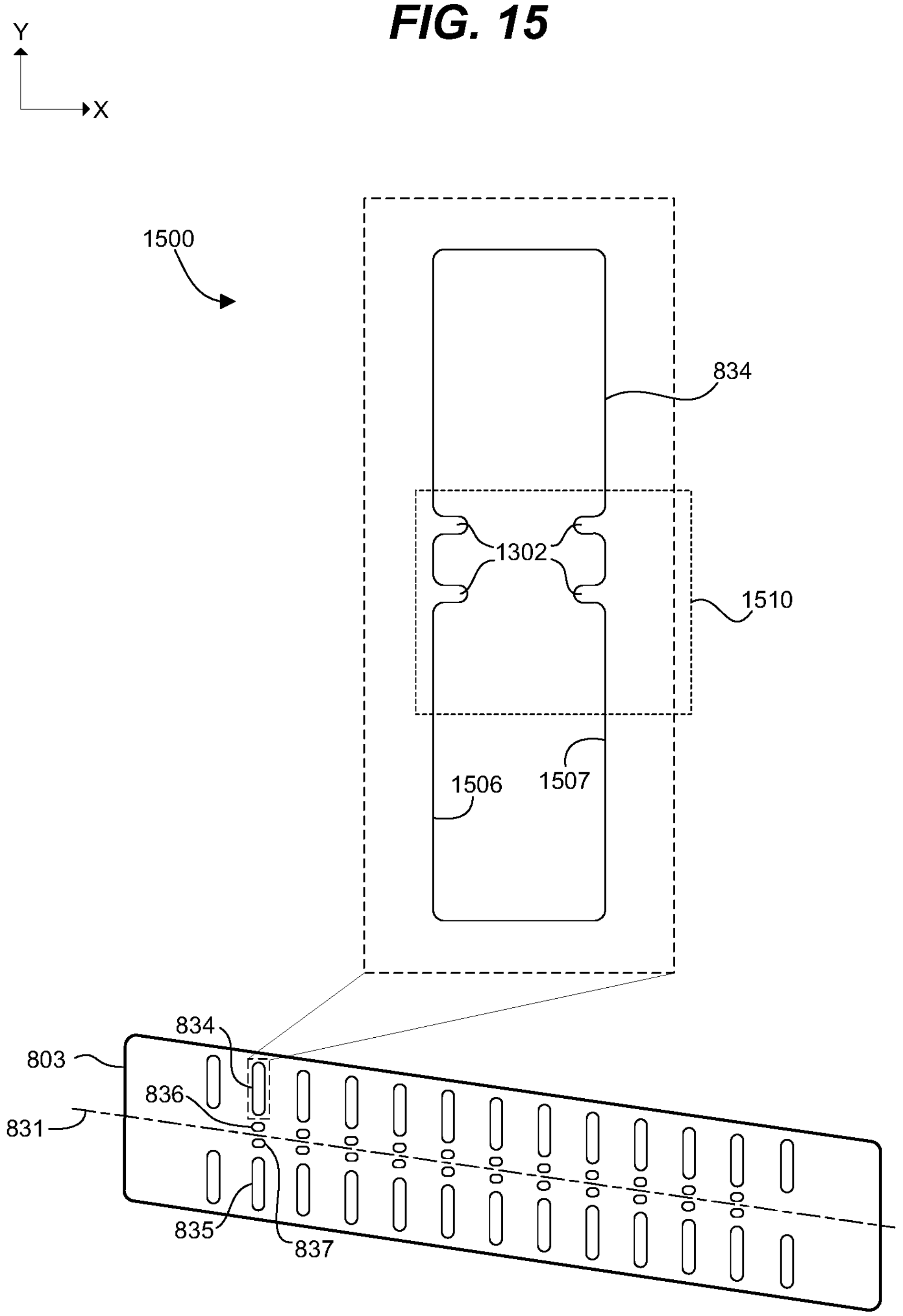
FIG. 15 illustrates a restrictor plate in an illustrative embodiment.

To implement intra-channel passive mixers 1302 in channel fluid passage 520, a restrictor plate 803 as disclosed above (see FIG. 8) may be etched or patterned with one or more intra-channel passive mixers 1302. FIG. 15 illustrates restrictor plate 803 in an illustrative embodiment. Zoom window 1500 illustrates a magnified view of a restrictor opening 834 on restrictor plate 803. Restrictor opening 834 is an elongated opening etched or cut into restrictor plate 803, and has opposing vertical side walls 1506-1507. In an embodiment, restrictor opening 834 is etched or patterned with one or more intra-channel passive mixers 1302 projecting inward from restrictor plate 803 into the restrictor opening 834. For example, restrictor opening 834 is etched so that intra-channel passive mixers 1302 project from side walls 1506-1507 toward a middle region of restrictor opening 834. Restrictor region 1510 of restrictor opening 834 represents where a restrictor 1110 of a jetting channel 402 is located. Thus, intra-channel passive mixers 1302 may be etched or patterned at restrictor region 1510 so that intra-channel passive mixers 1302 are disposed at the restrictor 1110 (e.g., channel fluid passage 520) of the jetting channel 402. Each restrictor opening 834-835 on restrictor plate 803 may be patterned in a similar manner. One technical benefit is intra-channel passive mixers 1302 may be patterned using existing lithography processes.

Figure 16:
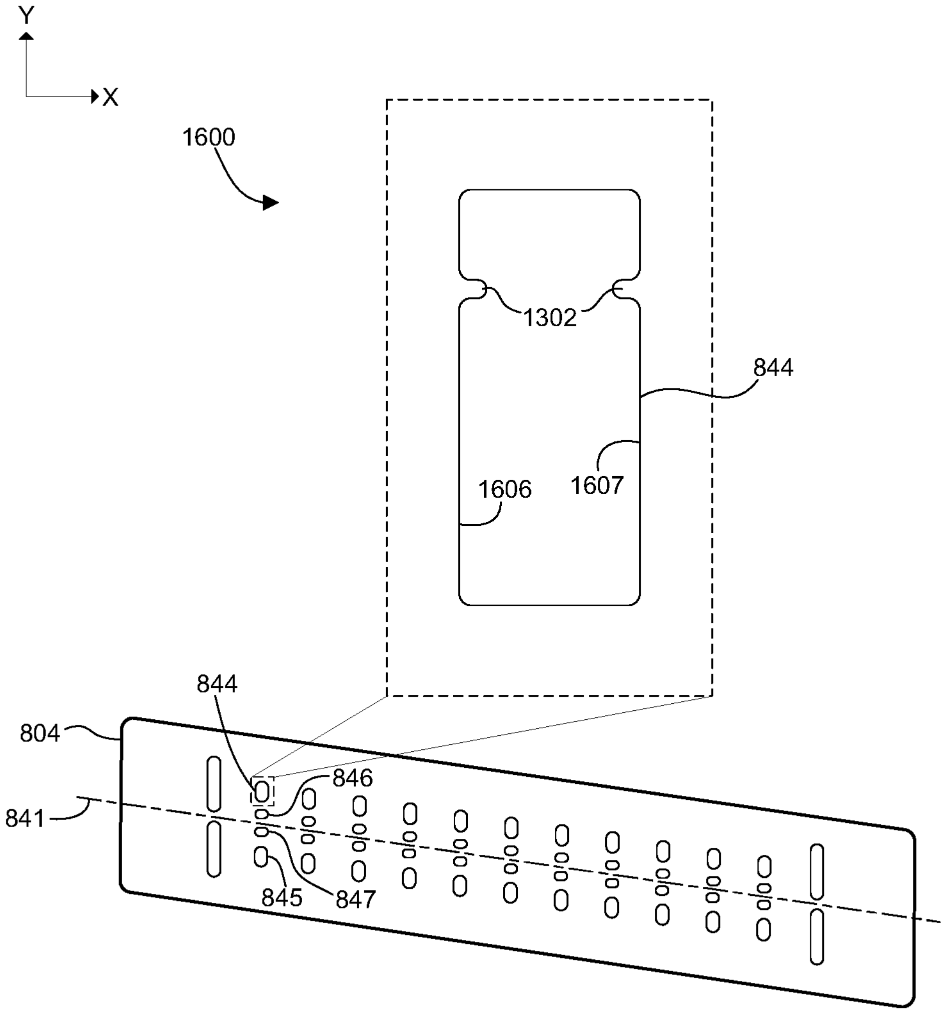
FIG. 16 illustrates a chamber plate in an illustrative embodiment.

To implement intra-channel passive mixers 1302 in a pressure chamber 412, a chamber plate 804 as disclosed above (see FIG. 8) may be etched or patterned with one or more intra-channel passive mixers 1302. FIG. 16 illustrates chamber plate 804 in an illustrative embodiment. Zoom window 1600 illustrates a magnified view of a chamber opening 844 of chamber plate 804. Chamber opening 844 is an elongated opening etched or cut into chamber plate 804, and has opposing side walls 1606-1607. In an embodiment, chamber opening 844 is etched or patterned with one or more intra-channel passive mixers 1302 projecting inward from chamber plate 804 into the chamber opening 844. For example, chamber opening 844 is etched so that intra-channel passive mixers 1302 project from side walls 1606-1607 toward a middle region of chamber opening 844. Each chamber opening 844-845 on chamber plate 804 may be patterned in a similar manner. Also, chamber plate 805 of plate stack 232 may be etched in a similar manner, or as an alternative to etching chamber plate 804. One technical benefit is intra-channel passive mixers 1302 may be patterned using existing lithography processes.

Figure 17:
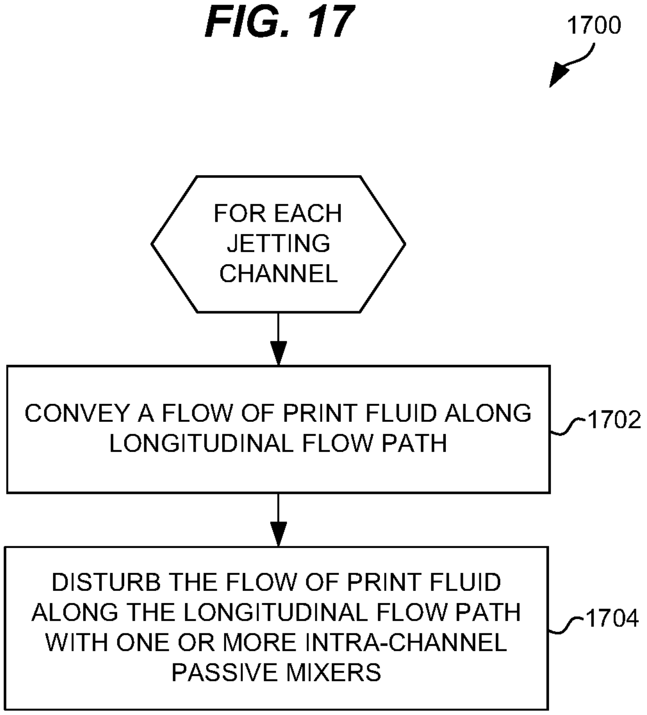
FIG. 17 is a flow chart illustrating a method of operating a printhead with one or more intra-channel passive mixers in an illustrative embodiment.

FIG. 17 is a flow chart illustrating a method 1700 of operating a printhead 104 with one or more intra-channel passive mixers 1302 in an illustrative embodiment. The steps of method 1700 will be described with reference to a printhead 104 having jetting channels 402 as in FIG. 13, but those skilled in the art will appreciate that method 1700 may be performed by other printheads. For each jetting channel 402, a flow of print fluid is conveyed along a longitudinal flow path 1310 of the jetting channel 402 (step 1702). One or more intra-channel passive mixers 1302 disturb the flow of print fluid along the longitudinal flow path 1310 (step 1704). For example, as the print fluid flows through channel fluid passage 520 into pressure chamber 412 (see FIG. 13), one or more intra-channel passive mixers 1302 may disturb the flow of print fluid through channel fluid passage 520. As the print fluid flows through pressure chamber 412, one or more intra-channel passive mixers 1302 may disturb the flow of print fluid through pressure chamber 412. One technical benefit is the print fluid is mixed within the jetting channel 402 to restore homogeneity of the print fluid.

Intra-Chamber Active Mixer

Figure 18:
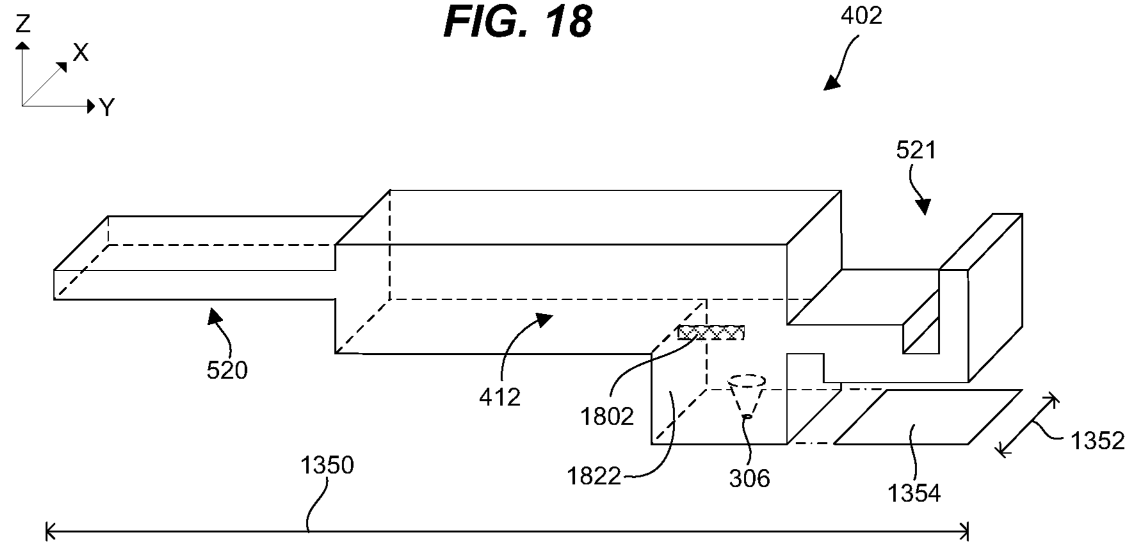
FIG. 18 is a perspective view of a jetting channel with one or more intra-chamber active mixers in an illustrative embodiment.

In an embodiment, one or more intra-chamber active mixers may be implemented in jetting channels 402. FIG. 18 is a perspective view of a jetting channel 402 with one or more intra-chamber active mixers 1802 in an illustrative embodiment. The diaphragm 410 has been removed in FIG. 18. As above, each pressure chamber 412 includes vertical side walls along the z-axis. In an embodiment, one or more intra-chamber active mixers 1802 may be disposed at the pressure chamber 412. An intra-chamber active mixer 1802 comprises a structural element within a pressure chamber 412 of a jetting channel 402 configured to oscillate, vibrate, or otherwise move in response to fluidic vibration within the pressure chamber 412. Other jetting channels 402 may have a similar configuration with an intra-chamber active mixer 1802 as shown in FIG. 18. One technical benefit of implementing an intra-chamber active mixer 1802 is the print fluid is mixed within a pressure chamber 412 to restore homogeneity of the print fluid.

Figure 19:
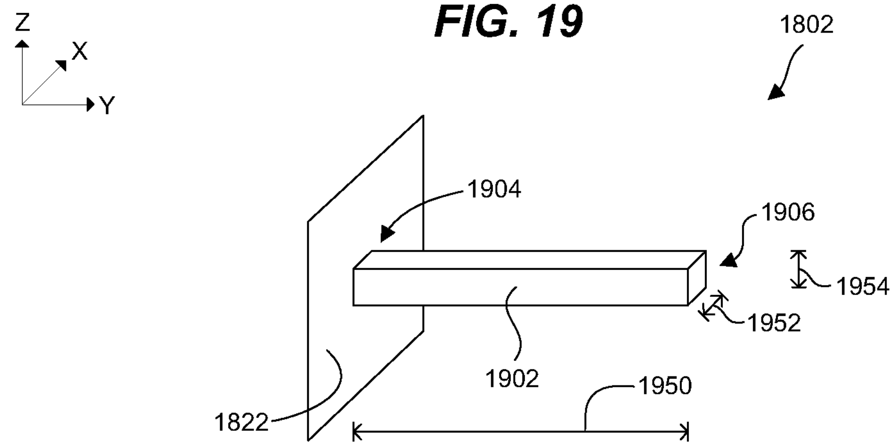
FIG. 19 is a perspective view of an intra-chamber active mixer in an illustrative embodiment.

FIG. 19 is a perspective view of an intra-chamber active mixer 1802 in an illustrative embodiment. Intra-chamber active mixer 1802 includes a cantilever 1902, which comprises a structural member that projects or protrudes from a vertical side wall of a pressure chamber 412. One end 1904 (i.e., a connected end) of cantilever 1902 is rigidly connected or attached to a vertical side wall 1822, and the other end 1906 (i.e., a free end) of cantilever 1902 is unattached to the pressure chamber 412 and is free to move. Cantilever 1902 has a length 1950, a width 1952, and a thickness 1954 or height. Although dimensions of a cantilever 1902 may vary as desired, the length 1950 of cantilever 1902 may be in the range of about 200-260 micrometers, the width 1952 of cantilever 1902 may be in the range of about 25-35 micrometers, and the thickness 1954 of cantilever 1902 may be in the range of about 15-60 micrometers.

Figure 20:
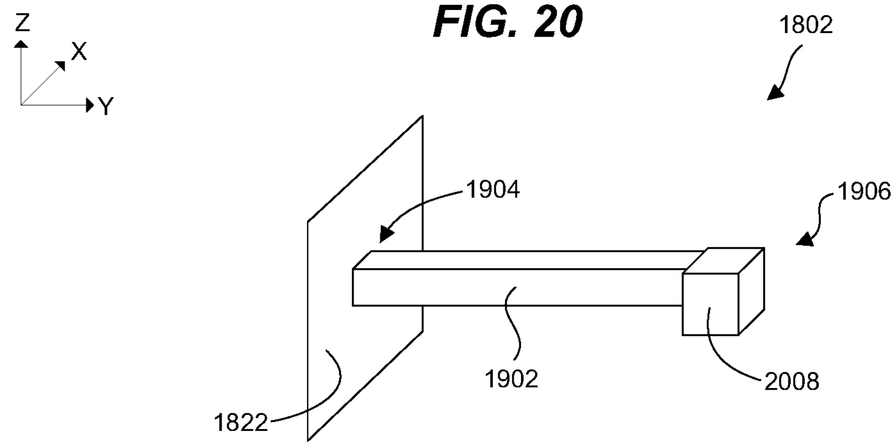
FIG. 20 is a perspective view of an intra-chamber active mixer in another illustrative embodiment.

FIG. 20 is a perspective view of an intra-chamber active mixer 1802 in another illustrative embodiment. As in FIG. 19, intra-chamber active mixer 1802 includes a cantilever 1902, which comprises a structural member that projects or protrudes from a vertical side wall of a pressure chamber 412. One end 1904 (i.e., a connected end) of cantilever 1902 is rigidly connected or attached to a vertical side wall 1822, and the other end 1906 (i.e., a free end) of cantilever 1902 is unattached to the pressure chamber 412 and is free to move. In this embodiment, intra-chamber active mixer 1802 further includes an end mass 2008 at the free end 1906 of cantilever 1902.

The free end 1906 of cantilever 1902 is free to oscillate, vibrate, or otherwise move in response to fluidic vibration within the pressure chamber 412. For example, when an actuator 416 fires in response to jetting pulses, pressure waves are created in pressure chamber 412 that cause jetting of droplets from its corresponding nozzle 306. The pressure waves in the print fluid drive the free end 1906 of cantilever 1902 to oscillate or vibrate. In other words, intra-chamber active mixer 1802 is driven (e.g., solely) from energy of the pressure waves, which has a technical benefit in that a separate actuator or drive mechanism is not needed to cause oscillation of free end 1906 of the cantilever 1902. Oscillation of cantilever 1902 creates local vortices and/or turbulence within the pressure chamber 412 that mix the print fluid within the pressure chamber 412. Thus, cantilever 1902 forms a micro-stirrer within a pressure chamber 412. One technical benefit of implementing an intra-chamber active mixer 1802 constructed with a cantilever 1902 or cantilever 1902 with an end mass 2008 is the print fluid is mixed within a pressure chamber 412 to restore homogeneity of the print fluid. This helps to prevent drying or sedimentation of the print fluid within the pressure chamber 412, which can result in a partially-blocked or fully-blocked nozzle 306. Another technical benefit is the jetting channel 402 may self-recover from missing jets caused by air bubbles.

The pressure waves in a pressure chamber 412 will resonate or absorb at a characteristic frequency. This characteristic frequency is determined by the geometry of the pressure chamber 412 (and other structures of a jetting channel 402) and their associated fluidic properties, and is referred to as the resonance frequency or Helmholtz frequency of a jetting channel 402. An intra-chamber active mixer 1802 also has a resonance frequency. For example, the resonance frequency of intra-chamber active mixer 1802 depends on the modulus of elasticity (i.e., the ratio of stress to strain in elastic range of deformation) for the material used to form cantilever 1902 (e.g., stainless steel), the moment of inertia for cantilever 1902 (e.g., a rectangular area), the length 1950 and width 1952 of cantilever 1902, the mass of end mass 2008 (if implemented), etc. In an embodiment, the characteristics of intra-chamber active mixer 1802 may be selected so that the resonance frequency of intra-chamber active mixer 1802 differs from the Helmholtz frequency of the jetting channel 402 by a threshold amount. Thus, the length 1950 and width 1952 of cantilever 1902, the mass of end mass 2008 (if implemented), the shape of cantilever 1902, etc., may be selected so that the resonance frequency of intra-chamber active mixer 1802 differs from the Helmholtz frequency of the jetting channel 402 by the threshold amount. For example, a typical Helmholtz frequency of a jetting channel 402 may be in the range of about 80-120 kHz, and the resonance frequency of intra-chamber active mixer 1802 may be selected or provisioned to much lower than the Helmholtz frequency, such as in a range of about 0.1-5 KHz. In an embodiment, the resonance frequency of intra-chamber active mixer 1802 is selected so that vibration of cantilever 1902 is far apart from the Helmholtz frequency of the jetting channel 402. One technical benefit is, due to the wide gap between the Helmholtz frequency of the jetting channel 402 and the resonance frequency of intra-chamber active mixer 1802, oscillation of the intra-chamber active mixer 1802 does not interfere with jetting of a jetting channel 402.

Figure 21A:
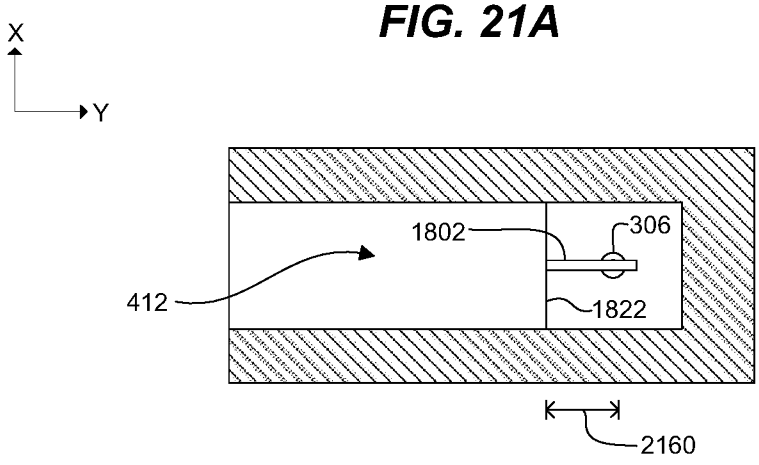
FIGS. 21A-21I are plan views of a pressure chamber with one or more intra-chamber active mixers in illustrative embodiments.
Figure 21B:
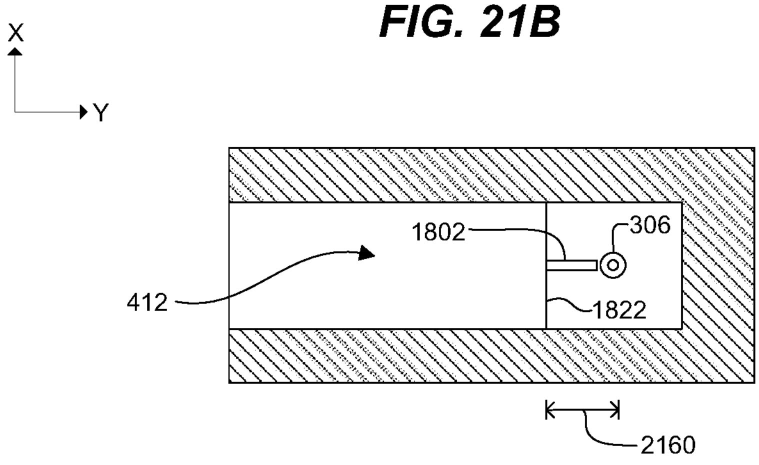
Figure 21C:
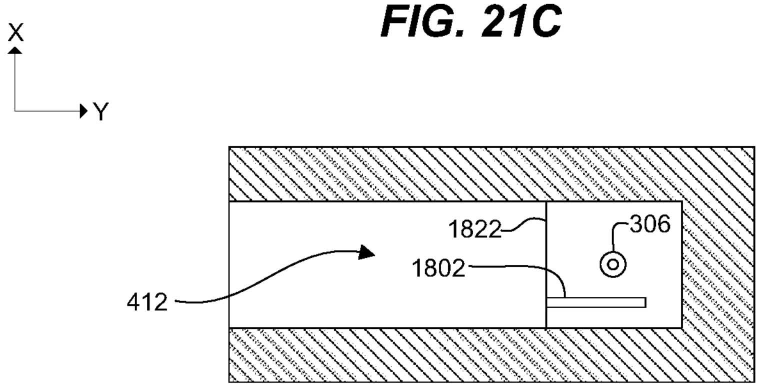
Figure 21D:
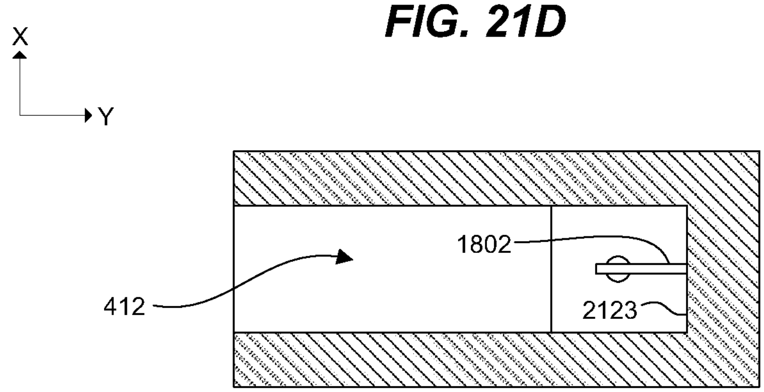

FIGS. 21A-21I are plan views of a pressure chamber 412 with one or more intra-chamber active mixers 1802 in illustrative embodiments. In FIG. 21A, an intra-chamber active mixer 1802 connects to a vertical side wall 1822 of the pressure chamber 412. In an embodiment, vertical side wall 1822 is generally perpendicular or transverse to the length 1350 of the jetting channel 402 (i.e., along the y-axis), and generally parallel to a width 1352 of the jetting channel 402 (i.e., along the x-axis) as shown in FIG. 18. Intra-chamber active mixer 1802 may be generally centered over or aligned with the nozzle 306 of the jetting channel 402 as shown in FIG. 21A, which provides a technical benefit of mixing print fluid evenly within the pressure chamber 412. The length 1950 of cantilever 1902 (see FIG. 19) may be at least as long as the distance 2160 between the vertical side wall 1822 and the nozzle 306 so that intra-chamber active mixer 1802 vertically overlaps (i.e., along the z-axis) with the nozzle 306 as shown in FIG. 21A. In an embodiment, the length 1950 of cantilever 1902 (see FIG. 19) may be shorter than the distance 2160 between the vertical side wall 1822 and the nozzle 306 so that intra-chamber active mixer 1802 does not vertically overlap (i.e., along the z-axis) with the nozzle 306 as shown in FIG. 21B. In FIG. 21C, an intra-chamber active mixer 1802 may be generally offset from the nozzle 306 of the jetting channel 402, which provides a technical benefit of manufacturing flexibility and turbulence location for mixing variations sometimes needed to avoid interference with the nozzle functions.

Figure 21E:
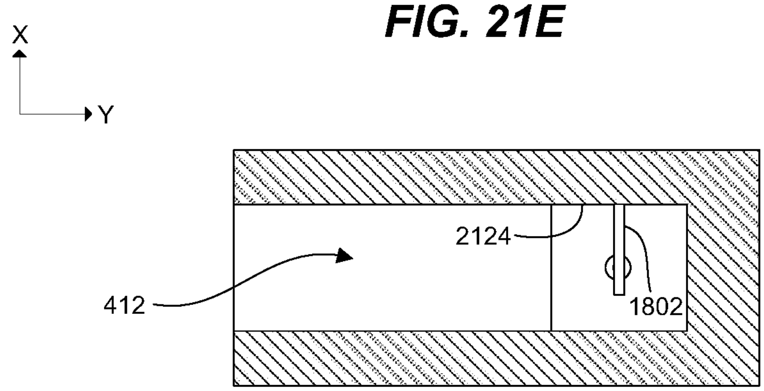
Figure 21F:
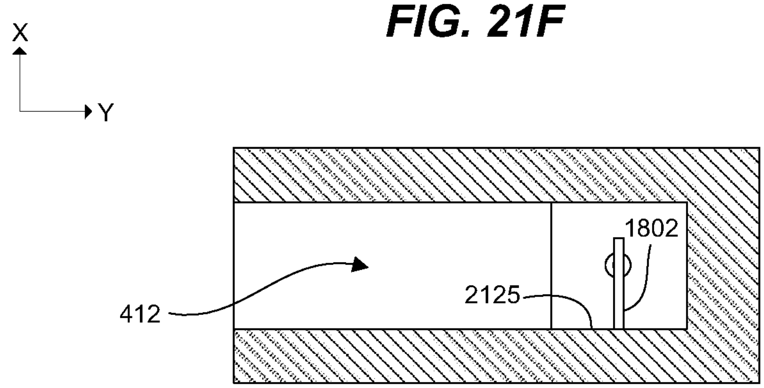
Figure 21G:
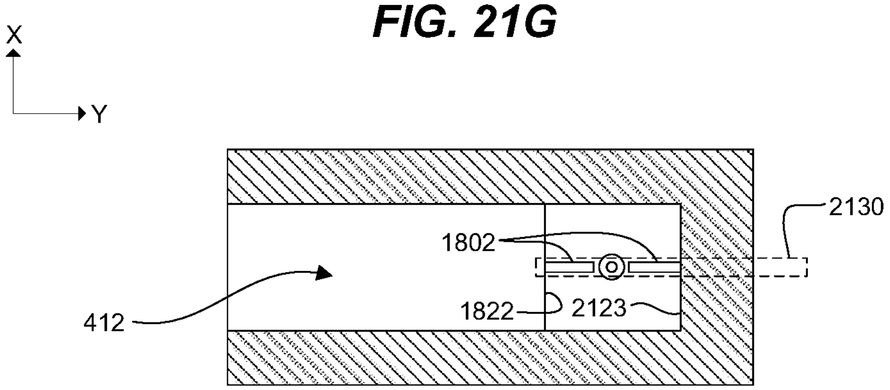
Figure 21H:
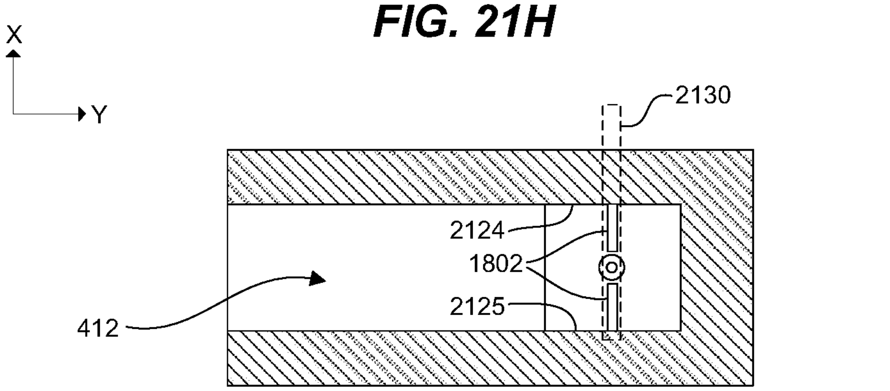
Figure 21I:
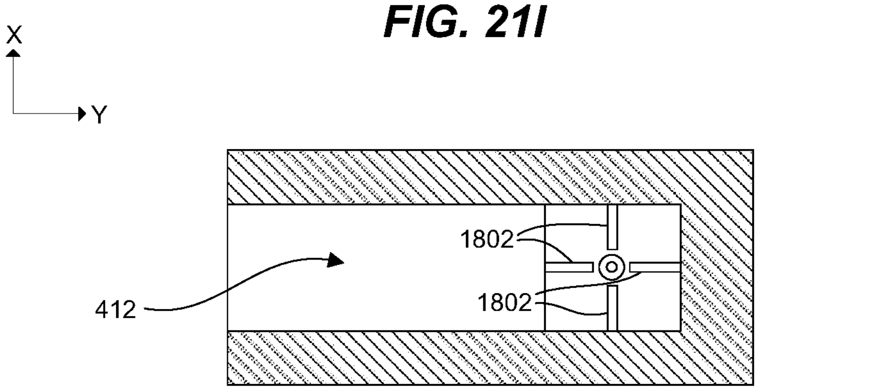

In some embodiments, an intra-chamber active mixer 1802 may be disposed on different vertical side walls of the pressure chamber 412. For example, in FIG. 21D, intra-chamber active mixer 1802 may connect to another vertical side wall 2123 of the pressure chamber 412 that is generally perpendicular or transverse to the length 1350 of the jetting channel 402 (i.e., along the y-axis), and generally parallel to a width 1352 of the jetting channel 402 (i.e., along the x-axis). In FIG. 21E, intra-chamber active mixer 1802 may connect to another vertical side wall 2124 of pressure chamber 412 that is generally parallel to the length 1350 of the jetting channel 402 (i.e., along the y-axis), and generally perpendicular or transverse to a width 1352 of the jetting channel 402 (i.e., along the x-axis). In FIG. 21F, intra-chamber active mixer 1802 may connect to another vertical side wall 2125 of pressure chamber 412 that is generally parallel to the length 1350 of the jetting channel 402 (i.e., along the y-axis), and generally perpendicular or transverse to a width 1352 of the jetting channel 402 (i.e., along the x-axis). In some embodiments, more than one intra-chamber active mixer 1802 may be utilized in a pressure chamber 412. In FIG. 21G, a pair 2130 of intra-chamber active mixers 1802 may be connected to opposing vertical sides walls 1822/2123. In FIG. 21H, a pair 2130 of intra-chamber active mixers 1802 may be connected to opposing vertical sides walls 2124-2125. In FIG. 21I, four intra-chamber active mixers 1802 may be connected to vertical sides walls 1822 and 2123-2125. A technical benefit of each configuration in FIGS. 21A-21I is that print fluid is mixed within a pressure chamber 412 to restore homogeneity of the print fluid. Multiple intra-chamber active mixers 1802 may be implemented for different ink types (e.g., higher viscosity inks, or heavily loaded inks).

Figure 22:
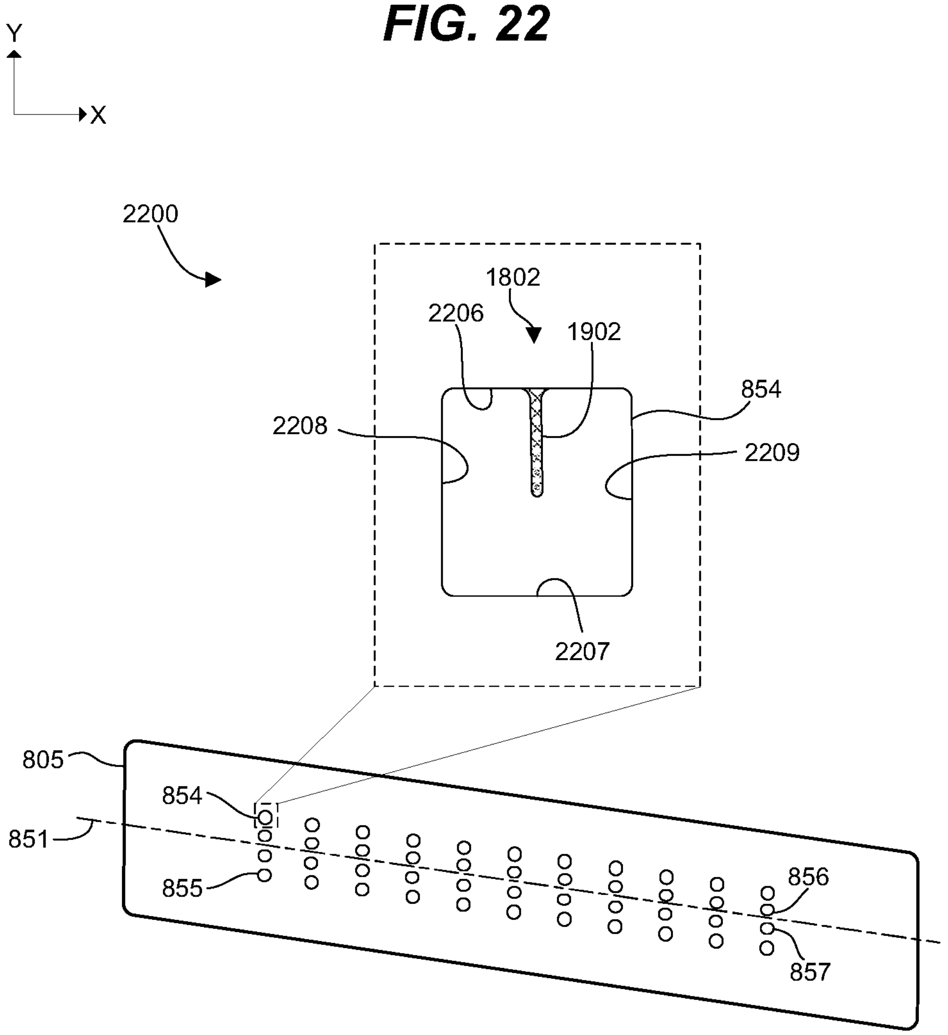
FIG. 22 illustrates a chamber plate in an illustrative embodiment.

To implement an intra-chamber active mixers 1802 in a pressure chamber 412, a chamber plate 805 as disclosed above (see FIG. 8) may be etched or patterned with one or more intra-chamber active mixers 1802. FIG. 22 illustrates chamber plate 805 in an illustrative embodiment. Zoom window 2200 illustrates a magnified view of a chamber opening 854 on chamber plate 805. Chamber opening 854 is an opening etched or cut into chamber plate 805, and has side walls 2206-2209. In an embodiment, chamber opening 854 is etched or patterned with one or more cantilevers 1902 of an intra-chamber active mixer 1802 projecting inward from chamber plate 805 into the chamber opening 854. This etching controls or defines the length 1950 and width 1952 of cantilever 1902. In an embodiment, cantilever 1902 may be partially etched on chamber plate 805 to control or define the thickness 1954 of cantilever 1902 (shown by hashing). Each chamber opening 854-855 on chamber plate 805 may be patterned in a similar manner. Although one cantilever 1902 is shown projecting from side wall 2206 in FIG. 22, chamber plate 805 may be etched or patterned in a similar manner to form one or more intra-chamber active mixers 1802 as illustrated in FIGS. 21A-21I. One technical benefit is intra-chamber active mixers 1802 may be patterned using existing lithography processes, and the dimensions of a cantilever 1902 may be accurately controlled with etching and/or partial etching processes.

Figure 23:
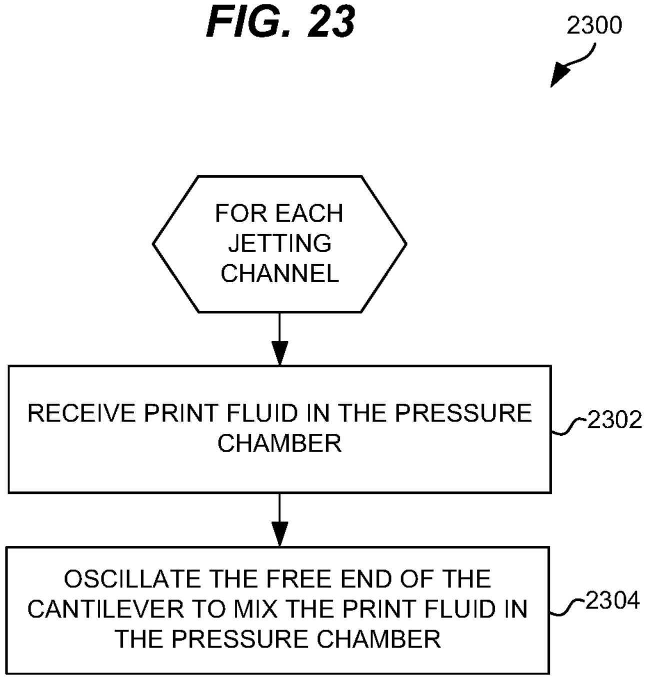
FIG. 23 is a flow chart illustrating a method of operating a printhead with an intra-chamber active mixer in an illustrative embodiment.

FIG. 23 is a flow chart illustrating a method 2300 of operating a printhead 104 with an intra-chamber active mixer 1802 in an illustrative embodiment. The steps of method 2300 will be described with reference to a printhead 104 having jetting channels 402 as in FIG. 18, but those skilled in the art will appreciate that method 2300 may be performed by other printheads. For each jetting channel 402, a print fluid is received in the pressure chamber 412 of the jetting channel 402 (step 2302). The free end 1906 of a cantilever 1902 oscillates to mix the print fluid in the pressure chamber 412 (step 2304). For example, when an actuator 416 fires in response to jetting pulses, pressure waves are created in the pressure chamber 412 that cause jetting of droplets from its corresponding nozzle 306. The pressure waves in the print fluid drive the free end 1906 of cantilever 1902 to oscillate or vibrate. This acts as a micro-stirrer that stirs the print fluid locally within the pressure chamber 412. One technical benefit is the print fluid is mixed within the pressure chamber 412 to restore homogeneity of the print fluid.

Intra-Channel Fluid Mixer

Figure 24:
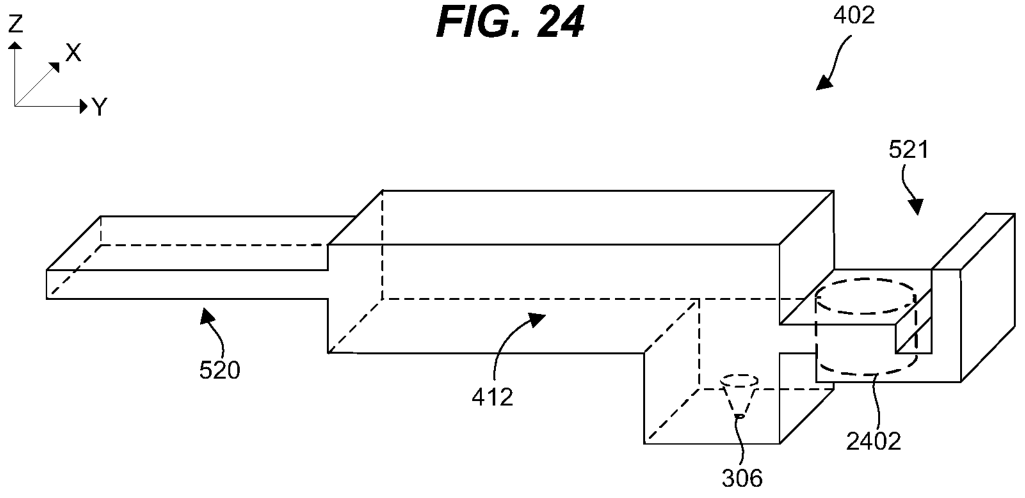
FIG. 24 is a perspective view of a jetting channel with an intra-channel fluid mixer in an illustrative embodiment.

In an embodiment, one or more intra-channel fluid mixers may be implemented in jetting channels 402. FIG. 24 is a perspective view of a jetting channel 402 with an intra-channel fluid mixer 2402 in an illustrative embodiment. The diaphragm 410 has been removed in FIG. 24. In an embodiment, an intra-channel fluid mixer 2402 is disposed at a channel fluid passage 521 that fluidly couples the pressure chamber 412 with a manifold 511. An intra-channel fluid mixer 2402 comprises a structural element within a jetting channel 402 configured to cause a circular rotation or motion of print fluid that flows between the pressure chamber 412 and the manifold 511. The circular rotation or motion of print fluid creates a vortex that mixes the print fluid. As illustrated in FIG. 24, jetting channel 402 (and other jetting channels 402 of printhead 104) may comprise flow-through jetting channels 540. Thus, intra-channel fluid mixer 2402 may be configured to cause circular rotation or motion of non-jetted print fluid that flows from pressure chamber 412 to a manifold through channel fluid passage 521. However, intra-channel fluid mixer 2402 may be disposed at different locations of a jetting channel 402, or may be used with a non-flow through type of jetting channel 402. One technical benefit of implementing an intra-channel fluid mixer 2402 is the print fluid is mixed within a jetting channel 402 to restore homogeneity of the print fluid. Other jetting channels 402 may have a similar configuration with an intra-channel fluid mixer 2402 as shown in FIG. 24.

Figure 25A:
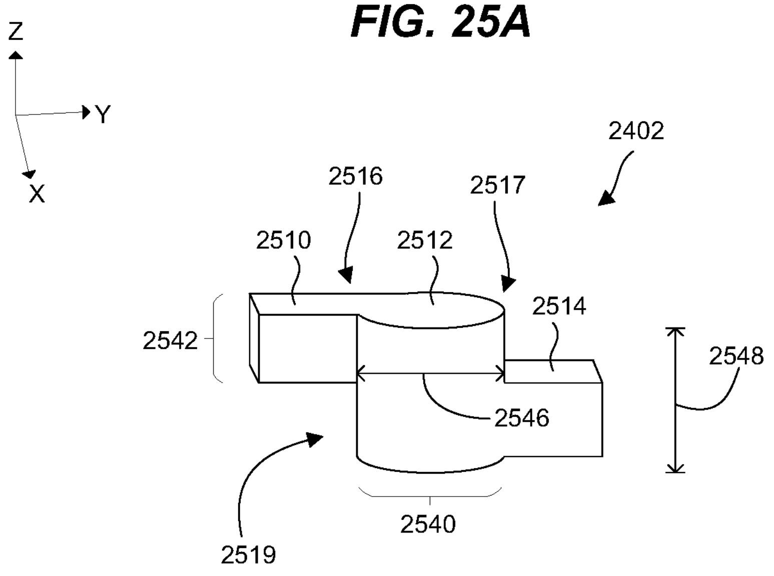
FIGS. 25A-25D illustrate an intra-channel fluid mixer in illustrative embodiments.
Figure 25B:
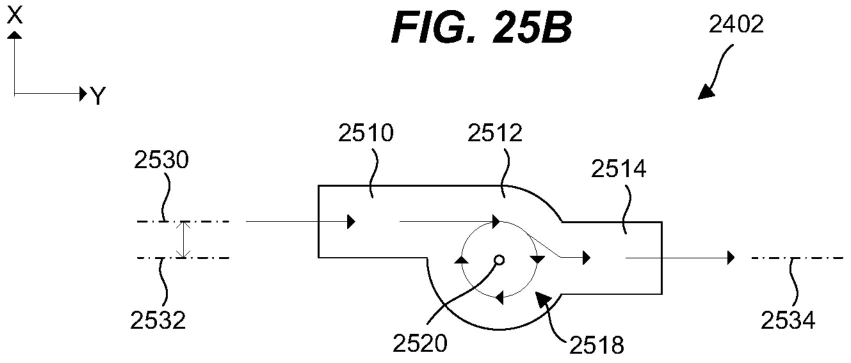
Figure 25C:
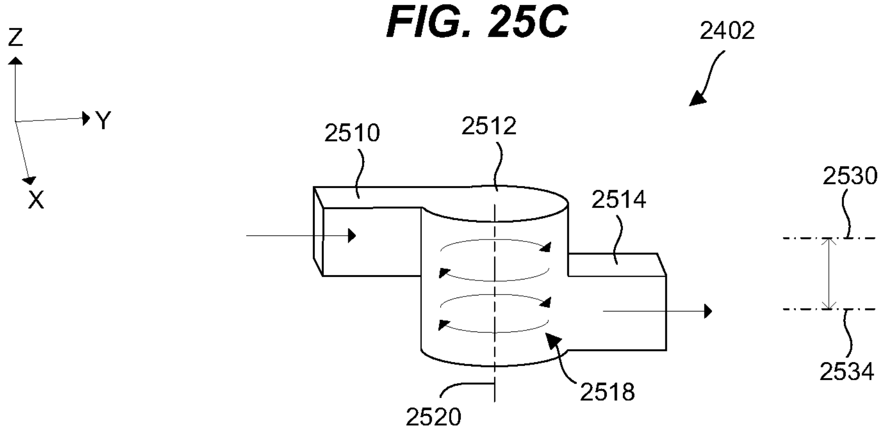

FIGS. 25A-25D illustrate an intra-channel fluid mixer 2402 in illustrative embodiments. FIG. 25A is a perspective view of an intra-channel fluid mixer 2402, which includes an inlet/outlet segment 2510 (i.e., a first inlet/outlet segment), a cylindrical mixing chamber 2512, and another inlet/outlet segment 2514 (i.e., a second inlet/outlet segment). In an embodiment, inlet/outlet segment 2510 is disposed at one side 2516 of mixing chamber 2512, and inlet/outlet segment 2514 is disposed generally at an opposite side 2517 of mixing chamber 2512 (i.e., along the y-axis). Segments 2510 and 2514 are referred to as "inlet/outlet" or "I/O" segments as print fluid may flow into or out of mixing chamber 2512 through either of segments 2510 and 2514 depending on the direction of flow of print fluid through a jetting channel 402. If a flow is only in one direction, segment 2510 may be referred to as an inlet segment, and segment 2514 may be referred to as an outlet segment. Mixing chamber 2512 is a cavity having a generally cylindrical shape 2519, and the dimensions of mixing chamber 2512 may be a diameter 2546 in the range of about 70-90 micrometers, and a height 2548 in the range of about 60-120 micrometers. FIG. 25B is a plan view of intra-channel fluid mixer 2402, which illustrates a flow of print fluid in one direction. Inlet/outlet segment 2510 is configured to receive a flow of print fluid (e.g., non-jetted print fluid from a pressure chamber 412 of a jetting channel 402). The print fluid flows from inlet/outlet segment 2510 into mixing chamber 2512. Due to the structure of mixing chamber 2512, a turbulent flow is created within mixing chamber 2512. For example, the volume 2540 of mixing chamber 2512 may be larger than the volume 2542 of inlet/outlet segment 2510 or inlet/outlet segment 2514 (see FIG. 25A). Also, the cylindrical shape 2519 of mixing chamber 2512 causes a circular rotation or motion of print fluid within mixing chamber 2512. The circular rotation or motion of print fluid creates a vortex 2518 as the print fluid revolves around an axis 2520. FIG. 25C is a perspective view of intra-channel fluid mixer 2402, which further shows the vortex 2518 created within mixing chamber 2512 as the print fluid revolves around axis 2520. In FIGS. 25B-25C, the print fluid circulating within mixing chamber 2512 exits through inlet/outlet segment 2514 (e.g., toward a manifold). The print fluid exiting mixing chamber 2512 is mixed via the turbulent flow created within mixing chamber 2512, which has a technical benefit of restoring homogeneity of the print fluid. When intra-channel fluid mixer 2402 is implemented in a channel fluid passage 521 as illustrated in FIG. 24, the print fluid may be mixed as/before the print fluid exits the jetting channel 402 (for a flow in one direction) or may be mixed as the print fluid enters the jetting channel 402 (for a flow in a reverse direction).

Figure 25D:
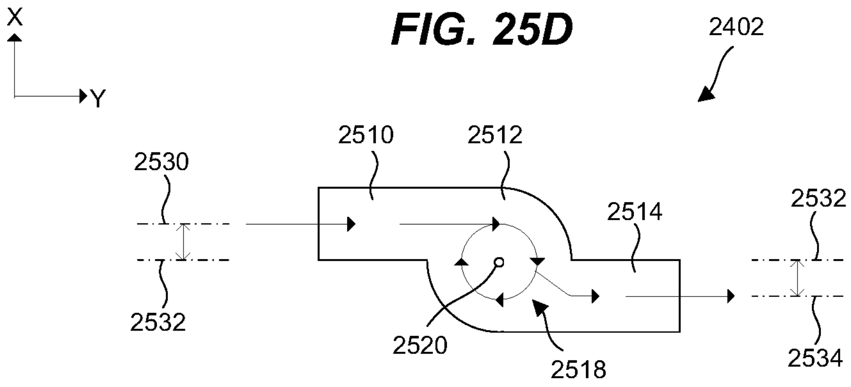

In an embodiment, inlet/outlet segment 2510 may be offset (e.g., horizontally offset) from mixing chamber 2512 to induce rotation of the print fluid within mixing chamber 2512 as illustrated in FIG. 25B. For example, the center 2530 of inlet/outlet segment 2510 (i.e., along the x-axis) may be offset from a center 2532 of mixing chamber 2512. At the same time, inlet/outlet segment 2514 may be generally centered with respect to mixing chamber 2512. For example, the center 2534 of inlet/outlet segment 2514 (i.e., along the x-axis) may be generally aligned with the center 2532 of mixing chamber 2512. In an embodiment, inlet/outlet segment 2514 may be offset (e.g., horizontally offset) from mixing chamber 2512. FIG. 25D is a plan view of intra-channel fluid mixer 2402. For example, the center 2534 of inlet/outlet segment 2514 (i.e., along the x-axis) may be offset from the center 2532 of mixing chamber 2512. In an embodiment, inlet/outlet segment 2510 may be vertically offset from inlet/outlet segment 2514 as illustrated in FIG. 25C. For example, the center 2530 of inlet/outlet segment 2510 (i.e., along the y-axis) may be offset from the center 2534 of inlet/outlet segment 2514. Each of these configurations has a technical benefit of causing a circular rotation or motion of print fluid within mixing chamber 2512.

Intra-channel fluid mixer 2402 as described above may be referred to as a passive fluid mixer, and it does not contain elements or features that actively move to stir the print fluid in mixing chamber 2512. Mixing is performed by the circular rotation or motion of print fluid in the mixing chamber 2512. Although examples of intra-channel fluid mixer 2402 were shown in FIGS. 25A-25D, other structures or designs may be considered herein.

Figure 26:
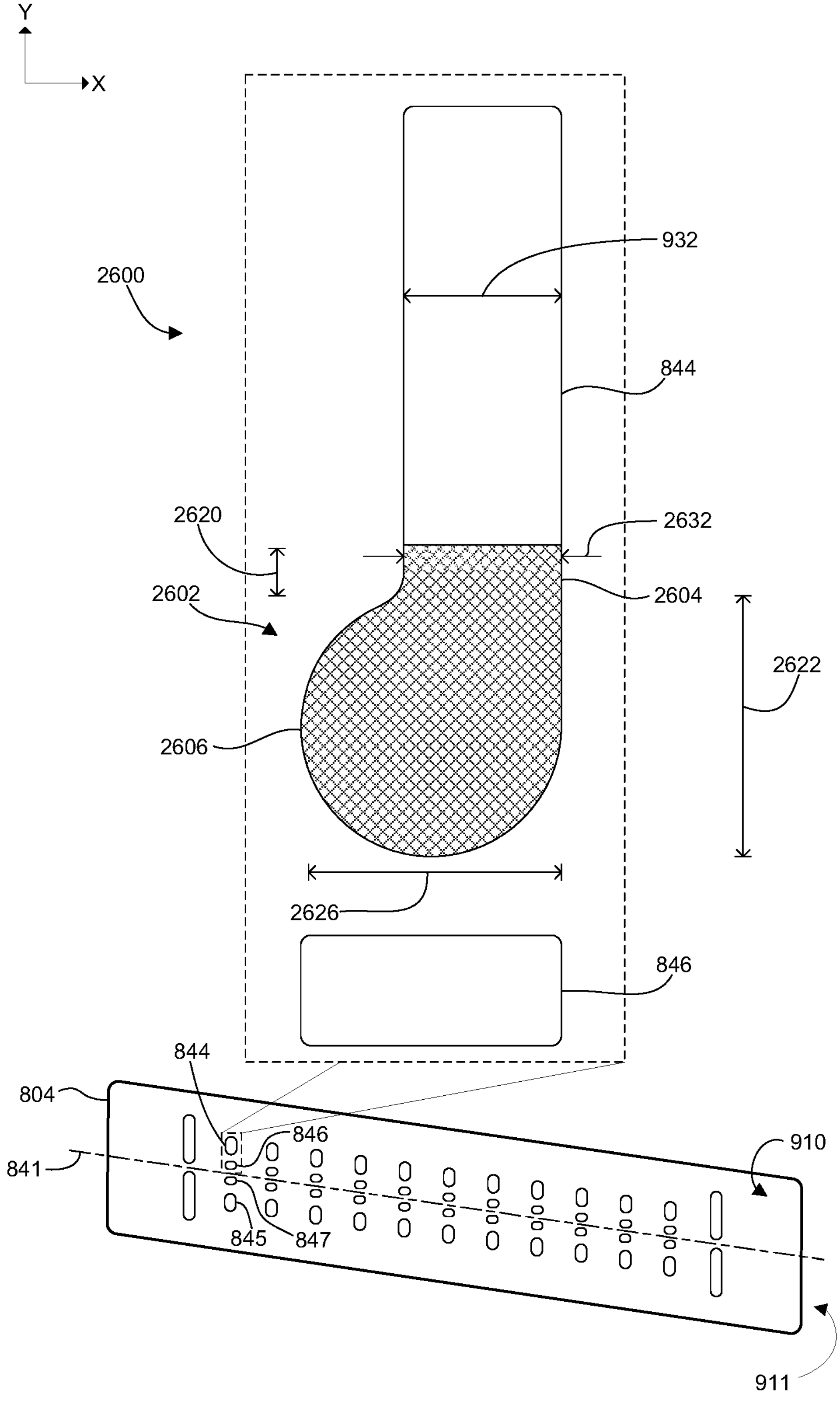
FIG. 26 illustrates a chamber plate in an illustrative embodiment.

In an embodiment, chamber plates 804-805 as shown in FIG. 8 may be etched or otherwise patterned to form intra-channel fluid mixer 2402. FIG. 26 illustrates chamber plate 804 in an illustrative embodiment. As described above, chamber plate 804 is a substantially flat or planar sheet of material, and thus has opposing planar surfaces 910-911. Planar surface 910 faces toward the discharge surface 220 of the printhead 104, while planar surface 911 faces toward housing 230. Zoom window 2600 illustrates a magnified view of a chamber opening 844 and a channel connector opening 846 of chamber plate 804. Chamber opening 844 is an elongated opening etched or cut into chamber plate 804, and channel connector opening 846 is an opening etched or cut into chamber plate 804 between chamber opening 844 and the longitudinal centerline 841 of chamber plate 804. In an embodiment, chamber plate 804 further includes a partially-etched segment 2602 that extends part way from chamber opening 844 toward channel connector opening 846. To form partially-etched segment 2602, chamber plate 804 is partially etched from planar surface 910 to an etching depth less than the thickness of chamber plate 804. For example, partially-etched segment 2602 may comprise a "half-etch" where the etching depth is about half the thickness of chamber plate 804. Thus, partially-etched segment 2602 does not form a hole through chamber plate 804. Partially-etched segment 2602 includes a rectangular segment 2604 that begins at chamber opening 844 and extends along a length 2620 (i.e., along the y-axis) toward channel connector opening 846. A width 2632 (i.e., along the x-axis) of rectangular segment 2604 may correspond with a width 932 of chamber opening 844. Partially-etched segment 2602 further includes a disc-like or circular segment 2606 that begins at rectangular segment 2604 and extends along a length 2622 (i.e., along the y-axis) toward channel connector opening 846. A diameter 2626 (i.e., along the x-axis) of circular segment 2606 is larger than the width 2632 of rectangular segment 2604, and may be in the range of about 70-90 micrometers. Rectangular segment 2604 of partially-etched segment 2602 forms an inlet/outlet segment 2510 of an intra-channel fluid mixer 2402, and circular segment 2606 forms at least part of a mixing chamber 2512 of an intra-channel fluid mixer 2402. A partially-etched segment 2602 may be etched between each chamber opening 844-845 and channel connector opening 846-847 of chamber plate 804 in a similar manner. One technical benefit is intra-channel fluid mixer 2402 may be patterned using existing lithography processes.

Figure 27:
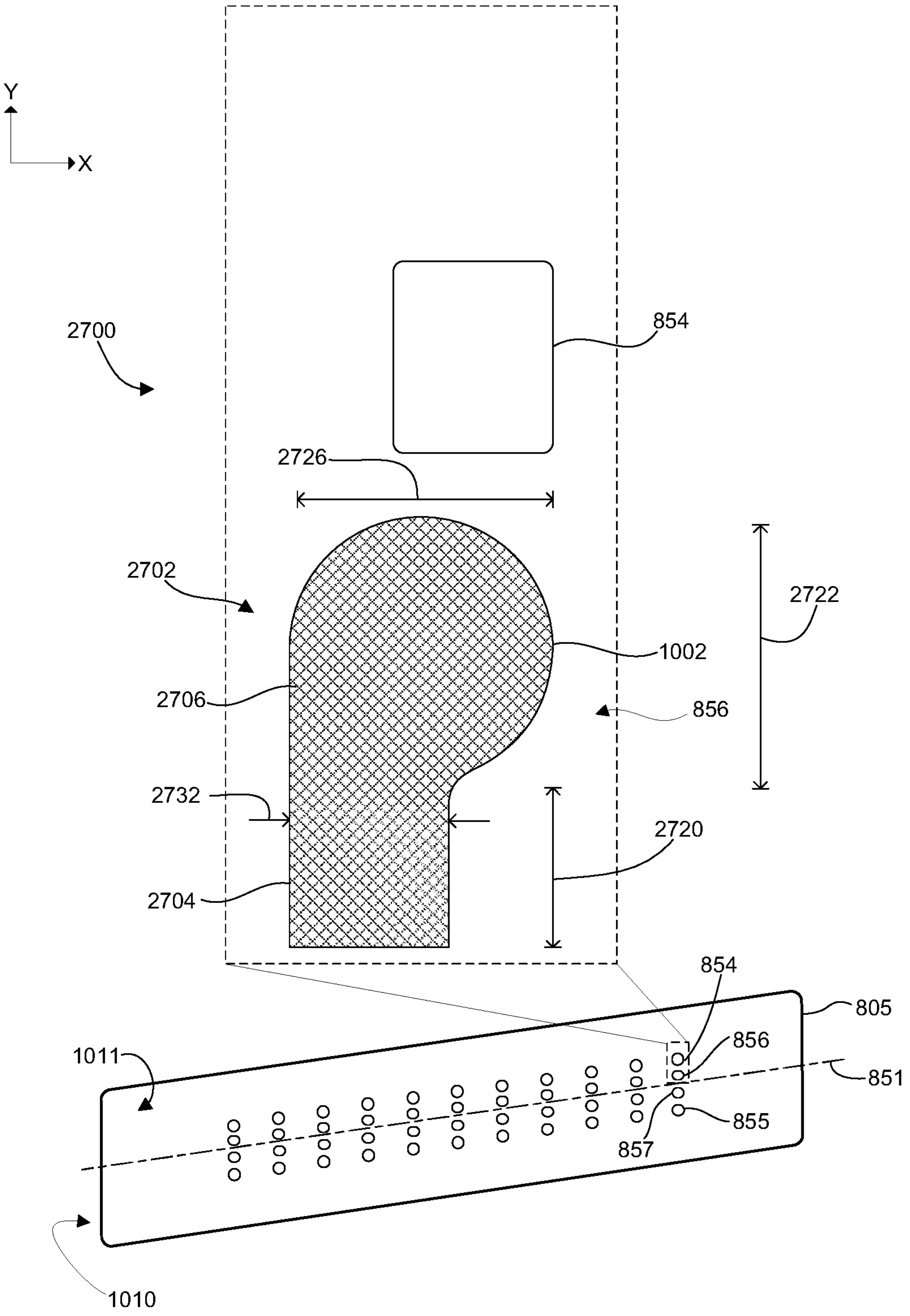
FIG. 27 illustrates a chamber plate in an illustrative embodiment.

FIG. 27 illustrates chamber plate 805 in an illustrative embodiment. As described above, chamber plate 805 is a substantially flat or planar sheet of material, and thus has opposing planar surfaces 1010-1011. Planar surface 1010 faces toward the discharge surface 220 of the printhead 104, while planar surface 1011 faces toward housing 230. Zoom window 2700 illustrates a magnified view of a chamber opening 854 and a channel connector feature 856 of chamber plate 805. Chamber opening 854 is an opening etched or cut into chamber plate 805, and channel connector feature 856 comprises a partially-etched segment 2702 etched into chamber plate 805 between chamber opening 854 and the longitudinal centerline 851 of chamber plate 805. To form partially-etched segment 2702, chamber plate 805 is partially etched from planar surface 1011 to an etching depth less than the thickness of chamber plate 805. For example, partially-etched segment 2702 may comprise a "half-etch" where the etching depth is about half the thickness of chamber plate 805. Thus, partially-etched segment 2702 does not form a hole through chamber plate 805. Partially-etched segment 2702 includes a rectangular segment 2704 that extends along a length 2720 (i.e., along the y-axis) between the longitudinal centerline 851 of chamber plate 805 and chamber opening 854. Partially-etched segment 2702 further includes a disc-like or circular segment 2706 that begins at rectangular segment 2704 and extends along a length 2722 (i.e., along the y-axis) toward chamber opening 854. A diameter 2726 (i.e., along the x-axis) of circular segment 2706 is larger than the width 2732 of rectangular segment 2704, and may be in the range of about 70-90 micrometers. Rectangular segment 2704 of partially-etched segment 2702 forms an inlet-outlet segment 2514 of an intra-channel fluid mixer 2402, and circular segment 2706 forms at least part of a mixing chamber 2512 of an intra-channel fluid mixer 2402. A partially-etched segment 2702 may be etched between each chamber opening 854-855 and channel connector feature 856-857 of chamber plate 805 in a similar manner. One technical benefit is intra-channel fluid mixer 2402 may be patterned using existing lithography processes.

The configuration of plate stack 232 in FIGS. 26-27 is provided as an example, and other configurations as considered herein.

Figure 28:
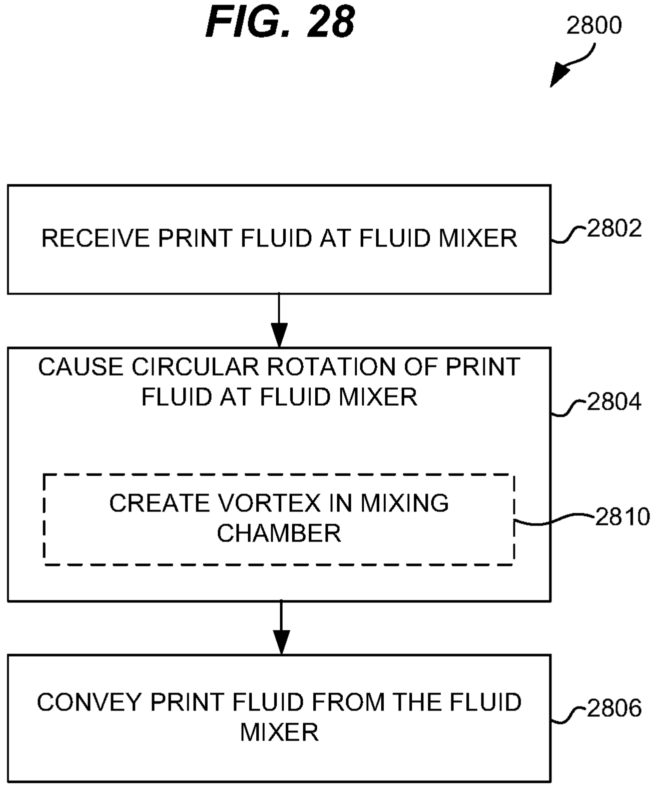
FIG. 28 is a flow chart illustrating a method of operating a printhead with an intra-channel fluid mixer in an illustrative embodiment.

FIG. 28 is a flow chart illustrating a method 2800 of operating a printhead 104 with an intra-channel fluid mixer 2402 in an illustrative embodiment. The steps of method 2800 will be described with reference to a printhead 104 having jetting channels 402 as in FIG. 24, but those skilled in the art will appreciate that method 2800 may be performed by other printheads.

For method 2800, intra-channel fluid mixer 2402 receives a print fluid (e.g., non-jetted print fluid) that flows between a pressure chamber 412 and a manifold through channel fluid passage 521 (step 2802). For example, inlet/outlet segment 2510 (see FIG. 25A) may receive a flow of print fluid from a pressure chamber 412 of a jetting channel 402. Intra-channel fluid mixer 2402 causes a circular rotation of the print fluid (step 2804). For example, the print fluid may flow from inlet/outlet segment 2510 into mixing chamber 2512, as shown in FIGS. 25B-25C. Mixing chamber 2512 causes a circular rotation or motion of the print fluid, and creates a vortex 2518 as the print fluid revolves around an axis 2520 (optional step 2810). The print fluid is then conveyed from the intra-channel fluid mixer 2402 along the channel fluid passage 521 (step 2806). For example, the print fluid circulating within mixing chamber 2512 exits through inlet/outlet segment 2514 (e.g., toward a manifold), as shown in FIGS. 25B-25C. One technical benefit is the print fluid is mixed within the jetting channel 402 to restore homogeneity of the print fluid.

Figure 29:
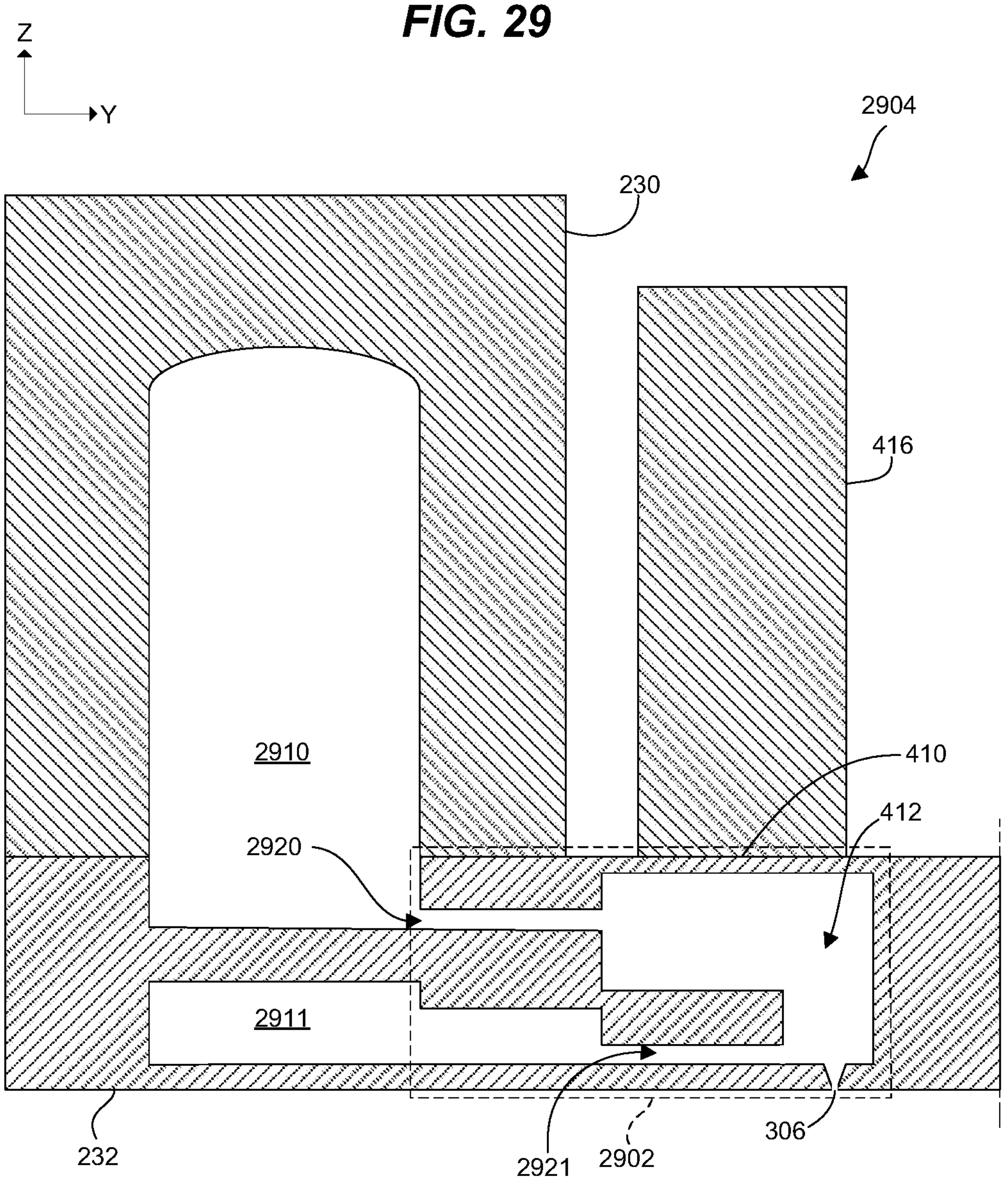
FIG. 29 is a cross-section of a flow-through printhead in an illustrative embodiment.

Embodiments above for the intra-channel passive mixers 1302, the intra-chamber active mixers 1802, and intra-channel fluid mixer 2402 were described with reference to a flow-through printhead 504 such as shown in FIGS. 5A and 6A-6B. However, one or more of the intra-channel passive mixers 1302, the intra-chamber active mixers 1802, and the intra-channel fluid mixer 2402 may be implemented in a different flow-through printhead while retaining the technical benefits noted above. Further, one or more of the intra-channel passive mixers 1302, the intra-chamber active mixers 1802, and the intra-channel fluid mixer 2402 may be implemented in a non-flow-through printhead while retaining the technical benefits noted above. FIG. 29 is a cross-section of a flow-through printhead 2904 in an illustrative embodiment. Printhead 2904 has a similar configuration as described above with jetting channels arranged in one or more rows. However, the flow-through jetting channels 2902 have a different configuration than described above. For example, a jetting channel 2902 includes a first channel fluid passage 2920 that fluidly couples a pressure chamber 412 to a manifold 2910, and includes a second channel fluid passage 2921 that fluidly couples the pressure chamber 412 to another manifold 2911. In this configuration, print fluid may flow into and out of the pressure chamber 412 via channel fluid passage 2920 and channel fluid passage 2921 in different lengthwise directions (i.e., along the y-axis) of a jetting channel 402, instead of in the same lengthwise direction as in FIG. 6B. For example, print fluid may flow from manifold 2910 into the pressure chamber 412 through channel fluid passage 2920 (i.e., from left to right), and non-jetted print fluid may flow out of the pressure chamber 412 into manifold 2911 through channel fluid passage 2921 in the opposite direction (i.e., from right to left). A flow-through printhead 2904 such as this may implement intra-channel passive mixers 1302, intra-chamber active mixers 1802, and/or intra-channel fluid mixer 2402 as described above.

Figure 30:
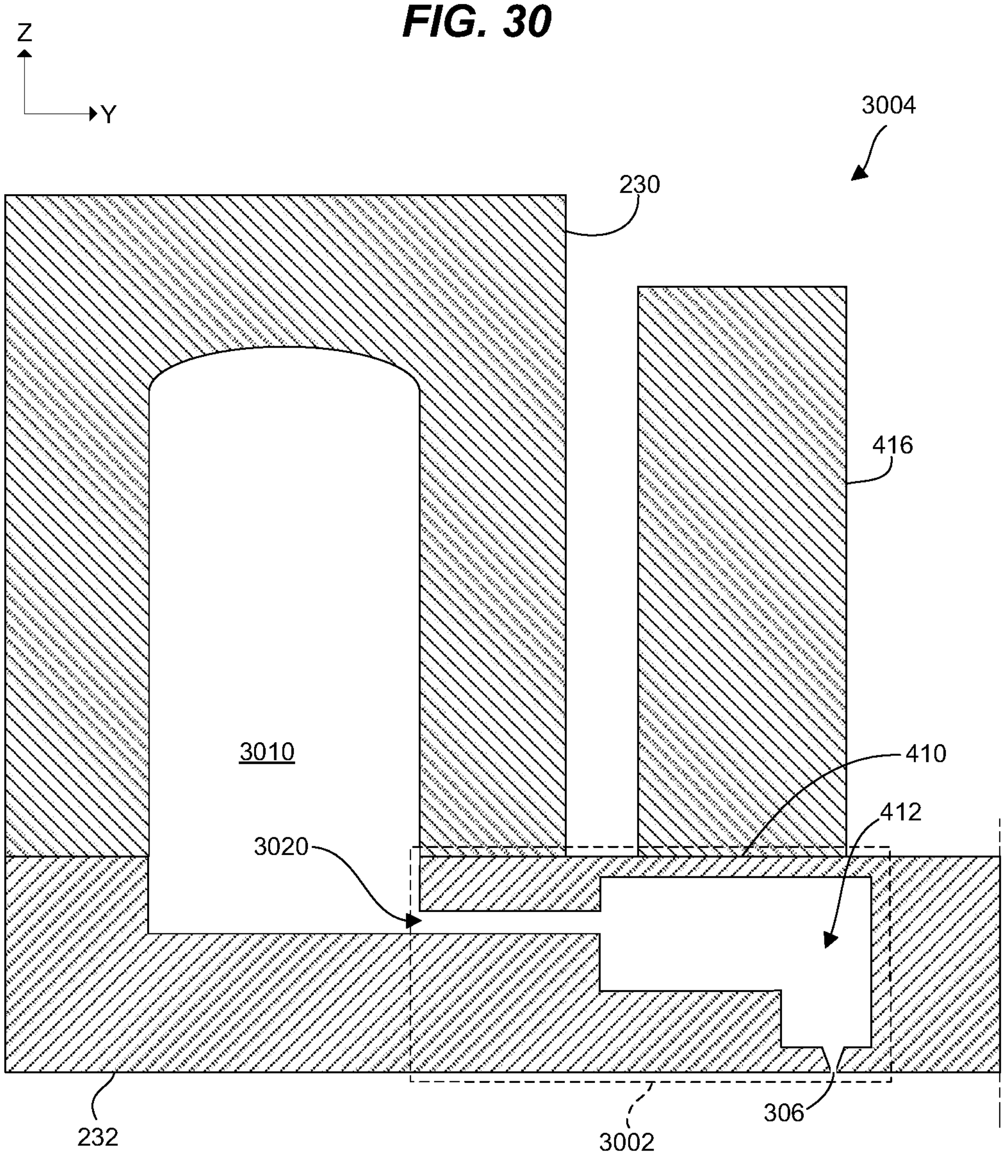
FIG. 30 is a cross-section of a non-flow-through printhead in an illustrative embodiment.

FIG. 30 is a cross-section of a non-flow-through printhead 3004 in an illustrative embodiment. Printhead 3004 has a similar configuration as described above with jetting channels arranged in one or more rows. However, the jetting channels are non-flow-through jetting channels 3002. For example, a jetting channel 3002 includes a single channel fluid passage 3020 that fluidly couples a pressure chamber 412 to a manifold 3010. However, there is no return path for non-jetted print fluid to flow out of the pressure chamber 412. A non-flow-through printhead 3004 such as this may implement intra-channel passive mixers 1302 and/or intra-chamber active mixers 1802 as described above while retaining the technical benefits noted above.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a printhead comprising a plurality of jetting channels, wherein each jetting channel of the plurality includes a diaphragm, a pressure chamber, and a nozzle configured to jet a print fluid, and one or more intra-chamber active mixers disposed in the pressure chamber. An intra-chamber active mixer comprises a cantilever having a connected end rigidly connected to a vertical side wall of the pressure chamber, and a free end that is free to move.

Example 2 includes the subject matter of Example 1, where the intra-chamber active mixer further comprises an end mass at the free end of the cantilever.

Example 3 includes the subject matter of Examples 1 and 2, where the intra-chamber active mixer is generally aligned with the nozzle of the jetting channel.

Example 4 includes the subject matter of Examples 1-3, where the intra-chamber active mixer vertically overlaps with the nozzle of the jetting channel.

Example 5 includes the subject matter of Examples 1-4, where the intra-chamber active mixer is offset from the nozzle of the jetting channel.

Example 6 includes the subject matter of Examples 1-5, where a pair of the intra-chamber active mixers are connected to opposing vertical sides walls of the pressure chamber.

Example 7 includes the subject matter of Examples 1-6, where characteristics of the intra-chamber active mixer are selected so that a resonance frequency of the intra-chamber active mixer differs from a Helmholtz frequency of the jetting channel.

Example 8 includes the subject matter of Examples 1-7, where the jetting channels comprise flow-through jetting channels.

Example 9 includes the subject matter of Examples 1-8, further comprising a jetting apparatus.

Some embodiments pertain to Example 10 that includes a printhead comprising a housing and a plate stack attached to the housing that forms a plurality of jetting channels, wherein each jetting channel of the plurality includes a diaphragm, a pressure chamber, and a nozzle configured to jet a print fluid, and one or more intra-chamber active mixers disposed in the pressure chamber. An intra-chamber active mixer comprises a cantilever having a connected end rigidly connected to a vertical side wall of the pressure chamber, and a free end that is free to move.

Example 11 includes the subject matter of Example 10, where the intra-chamber active mixer further comprises an end mass at the free end of the cantilever.

Example 12 includes the subject matter of Examples 10 and 11, where the intra-chamber active mixer is generally aligned with the nozzle of the jetting channel.

Example 13 includes the subject matter of Examples 10-12, where the intra-chamber active mixer vertically overlaps with the nozzle of the jetting channel.

Example 14 includes the subject matter of Examples 10-13, where the intra-chamber active mixer is offset from the nozzle of the jetting channel.

Example 15 includes the subject matter of Examples 10-14, where a pair of the intra-chamber active mixers are connected to opposing vertical sides walls of the pressure chamber.

Example 16 includes the subject matter of Examples 10-15, where characteristics of the intra-chamber active mixer are selected so that a resonance frequency of the intra-chamber active mixer differs from a Helmholtz frequency of the jetting channel.

Example 17 includes the subject matter of Examples 10-16, where the free end of the cantilever is driven to oscillate by pressure waves in the pressure chamber.

Example 18 includes the subject matter of Examples 10-17, where the plate stack includes a diaphragm plate that forms diaphragms of the jetting channels a support plate, a restrictor plate, a first chamber plate and a second chamber plate that form pressure chambers of the jetting channels and a nozzle plate having nozzle holes that define nozzles of the jetting channels. The second chamber plate forms the cantilever.

Example 19 includes the subject matter of Examples 10-18, where the second chamber plate includes chamber openings that form at least part of the pressure chambers of the jetting channels, wherein a chamber opening is etched with the cantilever projecting inward from the second chamber plate into the chamber opening.

Example 20 includes the subject matter of Examples 10-19, where the cantilever is partially etched on the second chamber plate to define a thickness of the cantilever.

Example 21 includes the subject matter of Examples 10-20, further comprising a jetting apparatus.

Some embodiments pertain to Example 22 that includes a method comprising operating a printhead comprising a plurality of jetting channels, wherein each jetting channel of the plurality includes a diaphragm, a pressure chamber, and a nozzle configured to jet a print fluid, and one or more intra-chamber active mixers disposed in the pressure chamber, wherein an intra-chamber active mixer comprises a cantilever having a connected end rigidly connected to a vertical side wall of the pressure chamber, and a free end that is free to move. Operating the printhead comprises receiving the print fluid in the pressure chamber and oscillating the free end of the cantilever to mix the print fluid in the pressure chamber.

Although specific embodiments were described herein, the scope of the invention is not limited to those specific embodiments. The scope of the invention is defined by the following claims and any equivalents thereof.

What is claimed is:

1. A printhead comprising:

a plurality of jetting channels, wherein each jetting channel of the plurality includes:

a diaphragm, a pressure chamber, and a nozzle configured to jet a print fluid; and one or more intra-chamber active mixers disposed in the pressure chamber;

wherein an intra-chamber active mixer comprises:

a cantilever having a connected end rigidly connected to a vertical side wall of the pressure chamber, and a free end that is free to move;

wherein characteristics of the intra-chamber active mixer are selected so that a resonance frequency of the intra-chamber active mixer differs from a Helmholtz frequency of the jetting channel.

2. The printhead of claim 1, wherein the intra-chamber active mixer further comprises:

an end mass at the free end of the cantilever.

3. The printhead of claim 1, wherein:

the intra-chamber active mixer is generally aligned with the nozzle of the jetting channel.

4. The printhead of claim 3, wherein:

the intra-chamber active mixer vertically overlaps with the nozzle of the jetting channel.

5. The printhead of claim 1, wherein:

the intra-chamber active mixer is offset from the nozzle of the jetting channel.

6. The printhead of claim 1, wherein:

a pair of the intra-chamber active mixers are connected to opposing vertical sides walls of the pressure chamber.

7. The printhead of claim 1, wherein:
the free end of the cantilever is driven to oscillate by pressure waves in the pressure chamber.

8. The printhead of claim 1, wherein:
the jetting channels comprise flow-through jetting channels.

9. A jetting apparatus comprising:
the printhead of claim 1.

10. A printhead comprising:
a housing; and
a plate stack attached to the housing that forms a plurality of jetting channels, wherein each jetting channel of the plurality includes:
a diaphragm, a pressure chamber, and a nozzle configured to jet a print fluid; and
one or more intra-chamber active mixers disposed in the pressure chamber;
wherein an intra-chamber active mixer comprises:
a cantilever having a connected end rigidly connected to a vertical side wall of the pressure chamber, and a free end that is free to move;
wherein characteristics of the intra-chamber active mixer are selected so that a resonance frequency of the intra-chamber active mixer differs from a Helmholtz frequency of the jetting channel.

11. The printhead of claim 10, wherein the intra-chamber active mixer further comprises:
an end mass at the free end of the cantilever.

12. The printhead of claim 10, wherein:
the intra-chamber active mixer is generally aligned with the nozzle of the jetting channel.

13. The printhead of claim 12, wherein:
the intra-chamber active mixer vertically overlaps with the nozzle of the jetting channel.

14. The printhead of claim 10, wherein:
the intra-chamber active mixer is offset from the nozzle of the jetting channel.

15. The printhead of claim 10, wherein:
a pair of the intra-chamber active mixers are connected to opposing vertical sides walls of the pressure chamber.

16. The printhead of claim 10, wherein:
the free end of the cantilever is free to oscillate in response to fluidic vibration within the pressure chamber.

17. The printhead of claim 10, wherein:
the free end of the cantilever is driven to oscillate by pressure waves in the pressure chamber.

18. The printhead of claim 10, wherein the plate stack includes:
a diaphragm plate that forms diaphragms of the jetting channels;
a support plate;
a restrictor plate;
a first chamber plate and a second chamber plate that form pressure chambers of the jetting channels; and
a nozzle plate having nozzle holes that define nozzles of the jetting channels;
wherein the second chamber plate forms the cantilever.

19. The printhead of claim 18, wherein the second chamber plate includes:
chamber openings that form at least part of the pressure chambers of the jetting channels;
wherein a chamber opening is etched with the cantilever projecting inward from the second chamber plate into the chamber opening.

20. The printhead of claim 19, wherein:
the cantilever is partially etched on the second chamber plate to define a thickness of the cantilever.

21. A jetting apparatus comprising:
the printhead of claim 10.

22. A method comprising:
operating a printhead, the printhead comprising:
a plurality of jetting channels, wherein each jetting channel of the plurality includes a diaphragm, a pressure chamber, a nozzle configured to jet a print fluid, and
one or more intra-chamber active mixers disposed in the pressure chamber;
wherein an intra-chamber active mixer comprises a cantilever having a connected end rigidly connected to a vertical side wall of the pressure chamber, and a free end that is free to move;
wherein characteristics of the intra-chamber active mixer are selected so that a resonance frequency of the intra-chamber active mixer differs from a Helmholtz frequency of the jetting channel;
wherein the operating comprises:
receiving the print fluid in the pressure chamber; and
oscillating the free end of the cantilever to mix the print fluid in the pressure chamber.

* * * * *